(12) United States Patent
Kuraki et al.

(10) Patent No.: US 10,951,312 B2
(45) Date of Patent: Mar. 16, 2021

(54) TRANSMITTING DEVICE, TRANSMISSION CONTROL DEVICE, AND TRANSMISSION METHOD

(71) Applicant: FUJITSU LIMITED, Kawasaki (JP)

(72) Inventors: Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/534,844

(22) Filed: Aug. 7, 2019

(65) Prior Publication Data
US 2019/0363794 A1 Nov. 28, 2019

Related U.S. Application Data

(63) Continuation of application No. PCT/JP2017/004790, filed on Feb. 9, 2017.

(51) Int. Cl.
*H04B 10/116* (2013.01)
*H04B 10/524* (2013.01)
*H04B 10/50* (2013.01)

(52) U.S. Cl.
CPC ......... *H04B 10/116* (2013.01); *H04B 10/502* (2013.01); *H04B 10/524* (2013.01)

(58) Field of Classification Search
CPC .................................................... H04B 10/116
See application file for complete search history.

(56) References Cited

U.S. PATENT DOCUMENTS

2008/0044188 A1* 2/2008 Kagawa ............ H04B 10/1141
398/128
2011/0069965 A1* 3/2011 Kim ................... H04B 10/1149
398/130
(Continued)

FOREIGN PATENT DOCUMENTS

JP 2008-206087 9/2008
JP 2009-290359 12/2009
(Continued)

OTHER PUBLICATIONS

International Search Report mailed in connection with PCT/JP2017/004790 and dated Mar. 7, 2017 (1 page).
(Continued)

*Primary Examiner* — Shi K Li
(74) *Attorney, Agent, or Firm* — Fujitsu Patent Center

(57) ABSTRACT

A transmitting device is disclosed. A lighting device changes a first characteristic and a second characteristic of light to be emitted along time series. A processor controls, in a period having a first time length, the lighting device to modulate the first characteristic of the light from the lighting device in the time series in accordance with a light emission pattern having a waveform according to information to be transmitted and having the first time length. The processor controls the lighting device to perform pulse modulation with a pulse pattern having a second time length shorter than the first time length for the second characteristic in accordance with the information. The processor sets peak and bottom values of the second characteristic of each pulse included in a subsection, for an average of the second characteristic to be a value maintaining the waveform of the light emission pattern.

7 Claims, 13 Drawing Sheets

(56) References Cited

U.S. PATENT DOCUMENTS

2015/0003837 A1* 1/2015 Lee .................. H04N 9/3111
398/130
2017/0099104 A1 4/2017 Kuraki et al.

FOREIGN PATENT DOCUMENTS

JP   2011-029871   2/2011
JP   2011-250231   12/2011
WO   2016/001972   1/2016

OTHER PUBLICATIONS

Written Opinion of the International Searching Authority mailed in connection with PCT/JP2017/004790, and dated Mar. 7, 2017, with partial English translation (6 pages).

* cited by examiner

SYMBOL VALUE '0'

SYMBOL VALUE '1'

TRANSMITTING DEVICE, TRANSMISSION CONTROL DEVICE, AND TRANSMISSION METHOD

CROSS-REFERENCE TO RELATED APPLICATION

This application is a continuation application of International application PCT/JP2017/004790 filed on Feb. 9, 2017 and designated the U.S., the entire contents of which are incorporated herein by reference.

FIELD

The present invention relates to, for instance, a transmitting device, a transmission control device, and a transmitting method.

BACKGROUND

Conventionally, a light emitting diode (LED) has been widely used as an illumination light source. LEDs are characterized by a fast response speed as compared to incandescent bulbs or fluorescent lamps. Using this feature, visible light communication technology has been studied, in which communication is performed by superimposing information on light emitted from an LED by blinking the LED at a speed, which may not be recognized by human eyes. In particular, a technique for superposing information to be transmitted on illumination light is also referred to as illumination light communication.

Use of a visible light communication has been considered as communication application at places where the use of radio waves is restricted, information distribution limited to a range where light reaches inside a room or the like, utilization in Intelligent Transport Systems (ITS), or the like.

In the visible light communication, in order to transmit data, it is proposed to modulate transmission data into a visible light signal formed by high-power pulsed light and low-power pulsed light (for instance, refer to Patent Document 1).

Patent Document 1: Japanese Patent Application Publication No. 2009-290359

SUMMARY

According to one aspect of an embodiment, there is provided a transmitting device. The transmission control device includes a lighting device capable of changing a first characteristic and a second characteristic of light to be emitted along time series; and a processor that controls, in a period having a first time length, the lighting device to modulate the first characteristic of the light emitted from the lighting device in the time series in accordance with a light emission pattern having a waveform according to information to be transmitted and having the first time length, controls the lighting device to perform pulse modulation with a pulse pattern having a second time length shorter than the first time length with respect to the second characteristic of the light emitted from the lighting device in accordance with the information to be transmitted, and sets, for each of a plurality of subsections obtained by dividing the period, a peak value and a bottom value of the second characteristic of each pulse included in a subsection, for an average value of the second characteristic of the light emitted from the lighting device in the subsection to be a value for maintaining the waveform of the light emission pattern.

According to another aspect of an embodiment, there is provided a transmission control device. The transmission control device includes a light emission pattern modulation section that controls a lighting device to modulate the first characteristic of light, which is emitted from the lighting device according to a light emission pattern having a waveform according to information to be transmitted and having a first time length, along time series in a period having the first time length; and a pulse pattern modulation section that modulates to perform a pulse modulation with a pulse pattern having a second time length shorter than the first time length with respect to a second characteristic of the light emitted from the lighting device according to the information to be transmitted, and sets, for each of a plurality of subsections obtained by dividing the period, a peak value and a bottom value of the second characteristic of each pulse included in the subsection, to make an average value of the second characteristic of the light emitted from the lighting device in the subsection to be a value for maintaining the waveform of the light emission pattern.

According to still another aspect of an embodiment, there is provided a communication method. The communication method includes modulating, in a period having a first time length, a first characteristic of light emitted from a lighting device in time series in accordance with a light emission pattern having a waveform according to information to be transmitted and having the first time length, and performing pulse modulation with a pulse pattern having a second time length shorter than the first time length with respect to a second characteristic of the light emitted from the lighting device in accordance with the information to be transmitted, and setting, for each of a plurality of subsections obtained by dividing the period, a peak value and a bottom value of the second characteristic of each pulse included in a subsection, to make an average value of the second characteristic of the light emitted from the lighting device in the subsection to be a value for maintaining the waveform of the light emission pattern.

According to a still further aspect of an embodiment, there is provided a computer program for causing a computer to perform a transmission process. The process includes modulating, in a period having a first time length, a first characteristic of light emitted from a lighting device in time series in accordance with a light emission pattern having a waveform according to information to be transmitted and having the first time length, and performing pulse modulation with a pulse pattern having a second time length shorter than the first time length with respect to the second characteristic of the light emitted from the lighting device in accordance with the information to be transmitted, and setting, for each of a plurality of subsections obtained by dividing the period, a peak value and a bottom value of the second characteristic of each pulse included in a subsection, to make an average value of the second characteristic of the light emitted from the lighting device in the subsection to be a value for maintaining the waveform of the light emission pattern.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

DESCRIPTION OF EMBODIMENT

In a case of superimposing information to be transmitted on visible light by pulse modulation, a light source may be blinked at a high speed, for instance, several kHz, in order for a person not to sense flicker of the visible light due to the pulse modulation. In order for the receiving device receiving information to demodulate the information superimposed on the visible light, the receiving device may need to identify such blinking of the visible light at high speed. For instance, in order to identify such blinking of the visible light at the high speed, it is preferable that the receiving device includes a rolling shutter type camera and is able to adjust an exposure or sensitivity.

However, depending on an exposure method of the camera, which the receiving device includes, the receiving device may not be able to identify such blinking of visible light at high speed. For instance, if shutter speed of the camera, which the receiving device include, is fixed at slower speed than a cycle of the pulse modulation, the receiving device does not identify such fast blinking of visible light. As a result, the receiving device fails to demodulate the transmitted information.

In the following, there is provide a transmitting device capable of transmitting information to a receiving device regardless of an exposure method of a camera included in the receiving device that receives light, on which the information is superimposed.

A communication system and a transmitting device used in the communication system will be described below with reference to the drawings. In this communication system, the transmitting device modulates a first characteristic of light emitted from a lighting device with a light emission pattern having a waveform in accordance with information to be transmitted and having a first time length. Furthermore, the transmitting device perform pulse modulation with respect to a second characteristic of the light emitted from the lighting device in accordance with information to be transmitted, with a pulse pattern having a second time length shorter than the first time length.

The transmitting device sets a peak value and a bottom value for the second characteristic of each of pulses included in a subsection for each of a plurality of subsections obtained by dividing the period having the first time length modulated with the light emission pattern, in order to maintain the waveform of the light emission pattern. By this operation, the transmitting device is able to transmit information superimposed on the light emitted from the lighting device to the receiving device regardless of an exposure method of a camera of the receiving device.

Figure 1:
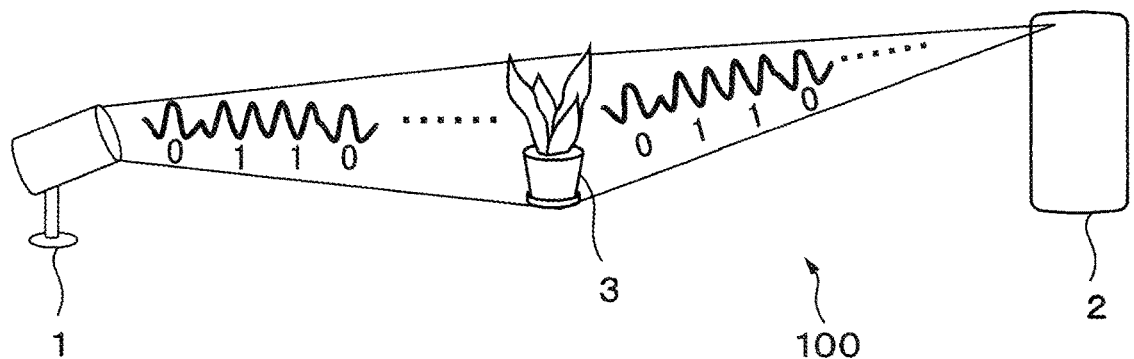
FIG. 1 is a schematic diagram illustrating a communication system according to an embodiment.

FIG. 1 is a schematic block diagram of a communication system in one embodiment. The communication system 100 includes a transmitting device 1 and a receiving device 2. Then, the transmitting device 1 superimposes information to be transmitted on light emitted by a lighting device of the transmitting device 1. The receiving device 2 includes an imaging device, and decodes information superimposed on light from a plurality of images arranged in time series, which are obtained by successively capturing, by the imaging device in the time series, an imaging range including an object 3 illuminated by light from the transmitting device 1.

In this example, the communication system 100 includes only one receiving device 2; however, the number of the receiving devices 2 included in the communication system 100 is not limited to one. The communication system 100 may include a plurality of receiving devices 2. Also, as described later in detail, the receiving device 2 is not limited to a device having an exposure system camera capable of identifying individual pulses of light, to which the pulse modulation is performed, and thus, the camera may have an exposure type camera, which may not distinguish individual pulses of the light, to which the pulse modulation is performed.

Figure 2:
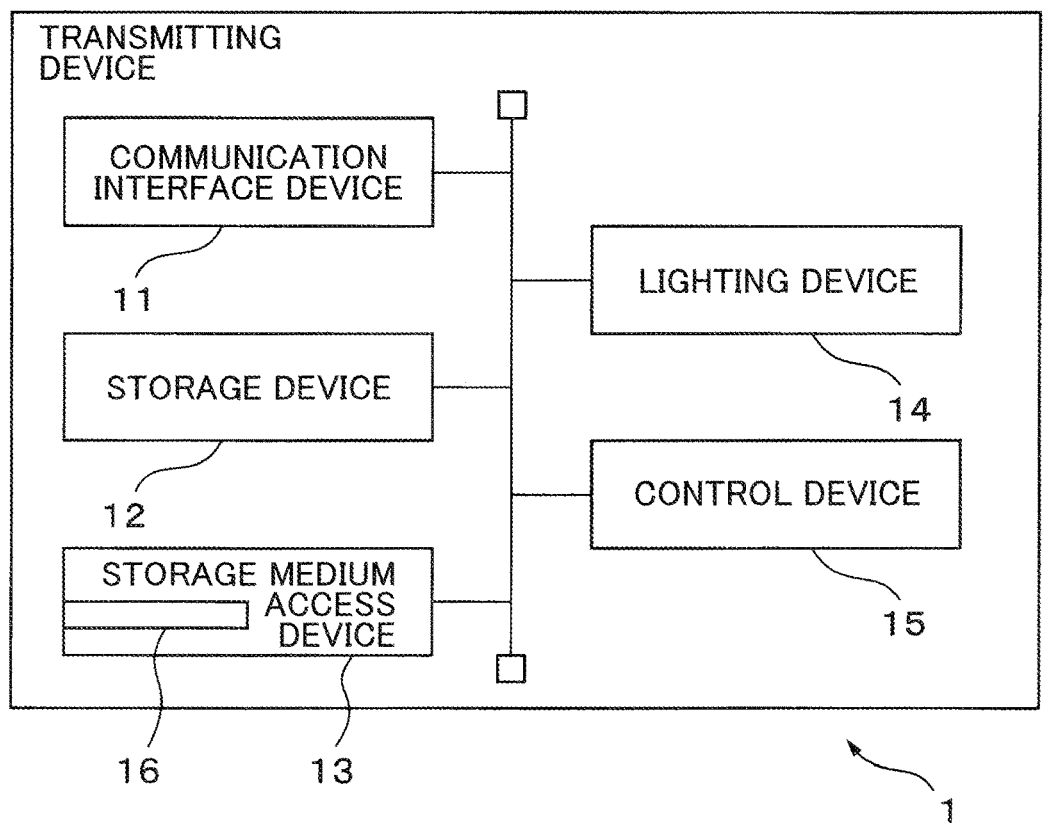
FIG. 2 is a diagram for illustrating a hardware configuration of a transmitter used in the communication system shown in FIG. 1.

FIG. 2 is a diagram illustrating a hardware configuration of the transmitting device. The transmitting device 1 includes a communication interface device 11, a storage device 12, a storage medium access device 13, a lighting device 14, and a control device 15 regarded as a processor. The transmitting device 1 superimposes information to be transmitted, which is acquired via the communication interface device 11 or the storage medium access device 13 or which is stored in advance in the storage device 12, on the light emitted by the lighting device 14, and transmits the information.

The communication interface device 11 includes, for instance, a communication interface for connecting the transmitting device 1 to a wired or wireless communication network, and a control circuit thereof. The communication interface device 11 passes information received from another device via a communication network to the control device 15.

The storage device 12 includes, for instance, a read-only nonvolatile semiconductor memory, and a readable and writable volatile semiconductor memory. The storage device 12 stores, for instance, information to be transmitted, which is acquired via the communication interface device 11 or is read from the storage medium access device 13. The storage device 12 also stores various information items and programs used by the control device 15 to perform a transmission process. For instance, the storage device 12 stores, for each of symbol values, waveform data representing the light emission pattern corresponding to a symbol value.

The waveform data representing the light emission pattern includes, for instance, a phase and a cycle of the light emission pattern at a control start time of light from the lighting device 14 depending on the light emission pattern, and a maximum value and a minimum value of the characteristic of light to be modulated. The storage device 12 also stores a pulse pattern in the pulse modulation corresponding to the symbol value for each symbol value. Also, in a case in which the information to be transmitted is fixed, the storage device 12 may store, in advance, waveform data and a pulse pattern representing the light emission pattern of each of symbols included in the information.

The storage medium access device 13 is a device for accessing a storage medium 16 such as, for instance, a magnetic disk, a semiconductor memory card, and an optical storage medium. The storage medium access device 13 reads, for instance, a computer program for the transmission process, which is stored in the storage medium 16 and executed on the control device 15, or information to be transmitted, and passes the computer program or the information to the control device 15.

The lighting device 14 includes at least one light emitting element capable of changing the first characteristic and the second characteristic of the light to be emitted along time series, and a drive circuit. The drive circuit drives the at least one light emitting element so as to change the characteristic of the light emitted from the at least one light emitting element in accordance with a control signal from the control device 15.

For instance, according to luminance of the light emitted from the light emitting element or brightness of a color component, which are instructed by the control signal, the drive circuit adjusts a magnitude of a current flowing to the light emitting element, or a duty ratio of a period, in which the current flows to the light emitting element (that is, a case in which pulse width modulation is applied). In a case in which the pulse width modulation is applied, ON or OFF of the current flowing to the light emitting element may be controlled in a cycle shorter than the pulse pattern, for instance, a cycle of $1/1000$ to $1/100$ of the second time length.

It is possible for the first characteristic of the light, which is able to be varied along time series, to be a luminescent color, for instance. Alternatively, the first characteristic of the light, which is able to be changed along the time series, may be luminance. Moreover, alternatively, the first characteristic of the light, which is able to be varied along the time series, may be a combination of the luminescent color and the luminance.

In addition, the second characteristic of the light, which is able be changed along the time series, may be a certain color component or a certain luminance. A combination of the first characteristic and the second characteristic is not particularly limited. For instance, the first characteristic may be a luminescent color, and the second characteristic may be a certain color component.

Alternatively, both the first characteristic and the second characteristic may be luminance. Alternatively, the first characteristic may be luminance and the second characteristic may be a luminescent color. With such a combination, because only one light emitting element needs to be controlled for the pulse modulation, control for multiplexing modulation by the light emission pattern with the pulse modulation is simplified.

In a case in which the first characteristic or the second characteristic is a characteristic pertinent to color, the lighting device 14 includes, for instance, at least two types of light emitting elements having different luminescent colors, such as at least two of a red LED, a green LED, and a blue LED. Thus, a ratio of the luminance emitted by each of the light emitting elements changes along time series, so that the color of the light emitted by the lighting device 14 also changes along the time series.

Alternatively, the lighting device 14 may include at least one light emitting element capable of modulating the luminescent color itself. The light emitting element capable of modulating the light luminescent color itself may be, for instance, a combination of a light emitting element, which emits light including a plurality of wavelengths, such as a fluorescent lamp, and a light modulation element capable of adjusting transmittance for each of the wavelengths of the light, such as a liquid crystal panel including color filters arranged in an array.

Also, in a case in which both the first characteristic and the second characteristic are luminance, the lighting device 14 includes at least one light emitting element capable of changing luminance in time series; for instance, a white LED or an organic electroluminescence (EL).

In response to the control signal from the control device 15, and according to the light emission pattern depending on a value of the symbol contained in information to be transmitted, the lighting device 14 superimposes the information on light emitted from the lighting device 14 by changing the first characteristic of the light to be emitted in the time series with the cycle having the first time length.

Furthermore, the lighting device 14 performs the pulse modulation with respect to the second characteristic of the light to be emitted at the cycle having the second time length shorter than the first time length in accordance with the pulse pattern depending on the value of the symbol. Therefore, the light emitted from the lighting device 14 is multiplexed and modulated by the modulation according to the light emission pattern and the pulse modulation.

The control device 15 is an example of a transmission control device, and includes one or more processors and their peripheral circuits. Thus, the control device 15 controls the entire transmitting device 1. In a case of receiving information to be transmitted via the communication interface device 11 or from the storage medium access device 13, the control device 15 temporarily stores the information in the storage device 12.

Then, in a case of executing the transmission process, the control device 15 reads information to be transmitted from the storage device 12 and divides the information in symbol units. For each of the symbols, the control device 15 reads, from the storage device 12, waveform data representing the light emission pattern according to a value of a symbol and data representing the pulse pattern according to the value of the symbol.

The control device 15 controls the lighting device 14 to change the first characteristic of the light emitted from the lighting device 14 in accordance with the light emission pattern in time series, and to change the second characteristic of the light emitted from the lighting device 14 depending on the pulse pattern along the time series.

The timing for performing the transmission process may be preset. Alternatively, the control device 15 may start the transmission process by an operation from a user interface section (not illustrated) or in response to a transmission process start instruction signal from another device received via the communication interface device 11. Alternatively, the control device 15 may repeatedly execute the transmission process at every defined cycle.

Figure 3:
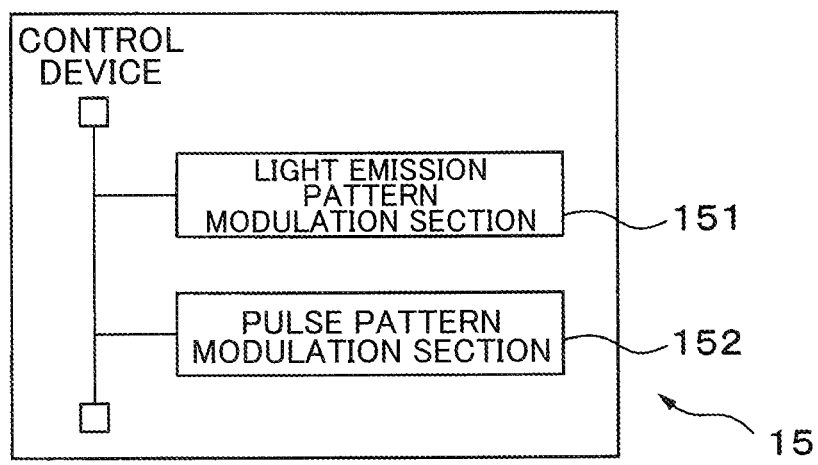
FIG. 3 is a diagram illustrating a functional configuration of a control device related to a transmission process.

FIG. 3 is a functional block diagram of the control device regarding the transmission process. The control device 15 includes a light emission pattern modulation section 151 and a pulse pattern modulation section 152.

Figure 4:
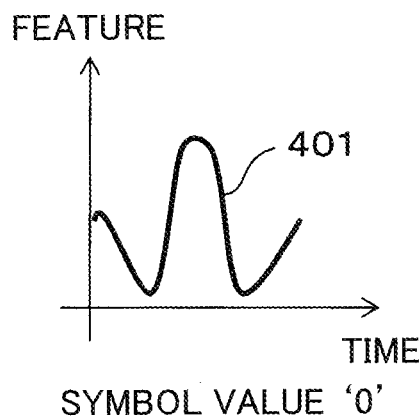
FIG. 4 is a diagram illustrating an example of a relationship between a light emission pattern and a value of a symbol to be superimposed.
Figure 4:
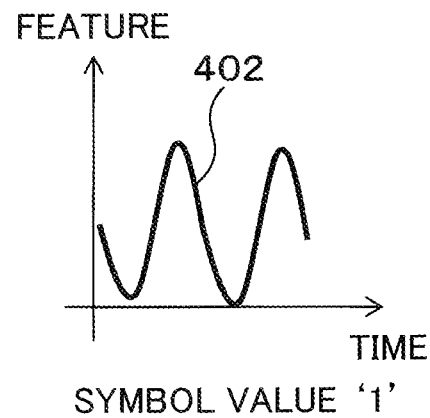

The light emission pattern modulation section 151 modulates the first characteristic of the light emitted from the lighting device 14 with the light emission pattern corresponding to the value of the symbol. FIG. 4 is a diagram illustrating an example of a relationship between the light emission pattern and the value of the symbol to be superimposed. In FIG. 4, a horizontal axis represents time, and a vertical axis represents the first characteristic of the light emitted from the transmitting device 1. A light emission pattern 401 and a light emission pattern 402 respectively correspond to symbol values '0' and '1'.

In each of the light emitting pattern 401 and the light emitting pattern 402, the first characteristic of the light periodically changes with time, and a phase is shifted by 180° with respect to each other. As described above, it is possible for the transmitting device 1 to superimpose information on the light emitted from the lighting device 14 by making the phase in a time variation of the first characteristic of the light different for each of the symbol values. The relationship between the light emission pattern and the symbol value is not limited to this example.

In the present embodiment, for instance, as depicted in FIG. 4, the light emission pattern is a periodic fluctuation pattern, in which the first characteristic of the light changes sinusoidally with a passage of time. The light emission pattern is not limited to this example, and may be a pattern, in which the first characteristic of the light periodically fluctuates in a triangular shape or a rectangular pulse shape, for instance.

In addition, the light emission pattern is not limited to a pattern changing periodically, and may be a pattern, in which the first characteristic of light changes monotonously within a period corresponding to one symbol, for instance. For instance, in the light emission pattern corresponding to the symbol value '0', the first characteristic of the light emitted from the lighting device 14 may change monotonically, in order to have the first value at a start time of the period corresponding to the symbol, and to have the second value at an end of the period.

In the light emission pattern corresponding to the symbol value '1', the first characteristic of the light emitted from the lighting device 14 has the second value at the start time of the period corresponding to the symbol, and at the end of the period, the light characteristic may change monotonically so that the first characteristic has a first value.

For instance, one cycle of the light emission pattern, that is, the first time length is set to several times the reciprocal of an imaging rate, to enable the receiving device 2 to reproduce a waveform of the light emission pattern at the imaging rate of an imaging device of the receiving device 2. For instance, the first time length may be several tens of msec to several hundreds of msec (that is, a first frequency corresponding to the first time length is several Hz to several tens of Hz).

For instance, the light emission pattern modulation section 151 divides information to be transmitted in bit string units each having one or more bits, and sets each bit string as one symbol. The light emission pattern modulation section 151 reads data representing the light emission pattern depending on a value of the symbol from the storage device 12.

The light emission pattern modulation section 151 sets a period having a certain length for each symbol. The light emission pattern modulation section 151 causes the lighting device 14 to repeat the light emission pattern depending on a symbol value for one to several cycles in that period.

The light emission pattern modulation section 151 may include a certain symbol string (for instance, '01010101') as a preamble at a certain position of information to be transmitted, for instance, at a beginning of the information.

Alternatively, the light emission pattern modulation section 151 may include an error detection code such as a cyclic redundancy check (CRC) code in the information to be transmitted. By including the symbol string or the error detection code in the information to be transmitted by the light emission pattern modulation section 151, it is possible for the receiving device 2 to easily and correctly decode the information transmitted from the transmitting device 1.

It is possible for the light emission pattern modulation section 151 to use various modulation methods used in wireless communication as a modulation method of the light emission pattern depending on the value of the symbol. For instance, the light emission pattern modulation section 151 may associate one symbol with one bit. In this case, the light emission pattern modulation section 151 inverts a phase by 180° between the light emission pattern, of which a symbol value corresponds to '0', and the light emission pattern, of which a symbol value corresponds to '1', as a binary phase-shift keying (BPSK).

Also, the light emission pattern modulation section 151 may make two bits correspond to one symbol. In this case, for instance, the light emission pattern modulation section 151 may set the light emission pattern, in which the first characteristic of light fluctuates periodically in accordance with a quadrature phase-shift keying (QPSK). That is, the light emission pattern modulation section 151 sets the light emission pattern, of which a phase is different every 90° for each of four possible values ('00', '01', '10', '11') of the symbol and which periodically changes the first characteristic.

Alternatively, the light emission pattern modulation section 151 may also modulate a change range (hereinafter, referred to as 'amplitude level') of the first characteristic of the light depending on the value of the symbol. In this case, the light emission pattern modulation section 151 may set the light emission pattern, in which a combination of the amplitude level and the phase is different for each of the possible values of the symbol, such as a quadrature amplitude modulation (QAM). At that time, with regard to the amplitude level, the light emission pattern modulation section 151 may monotonously increase the amplitude level within a period corresponding to the symbol for a certain symbol value, and monotonously decrease the amplitude level within the period corresponding to the symbol for another symbol value.

As described above, by changing the amplitude level depending on the value of the symbol within the period corresponding to one symbol, even if the amplitude level itself changes due to reflection or scattering of the light from the lighting device 14 by the object 3, it is possible for the receiving device 2 to easily and accurately specify the light emission pattern.

Figure 5:
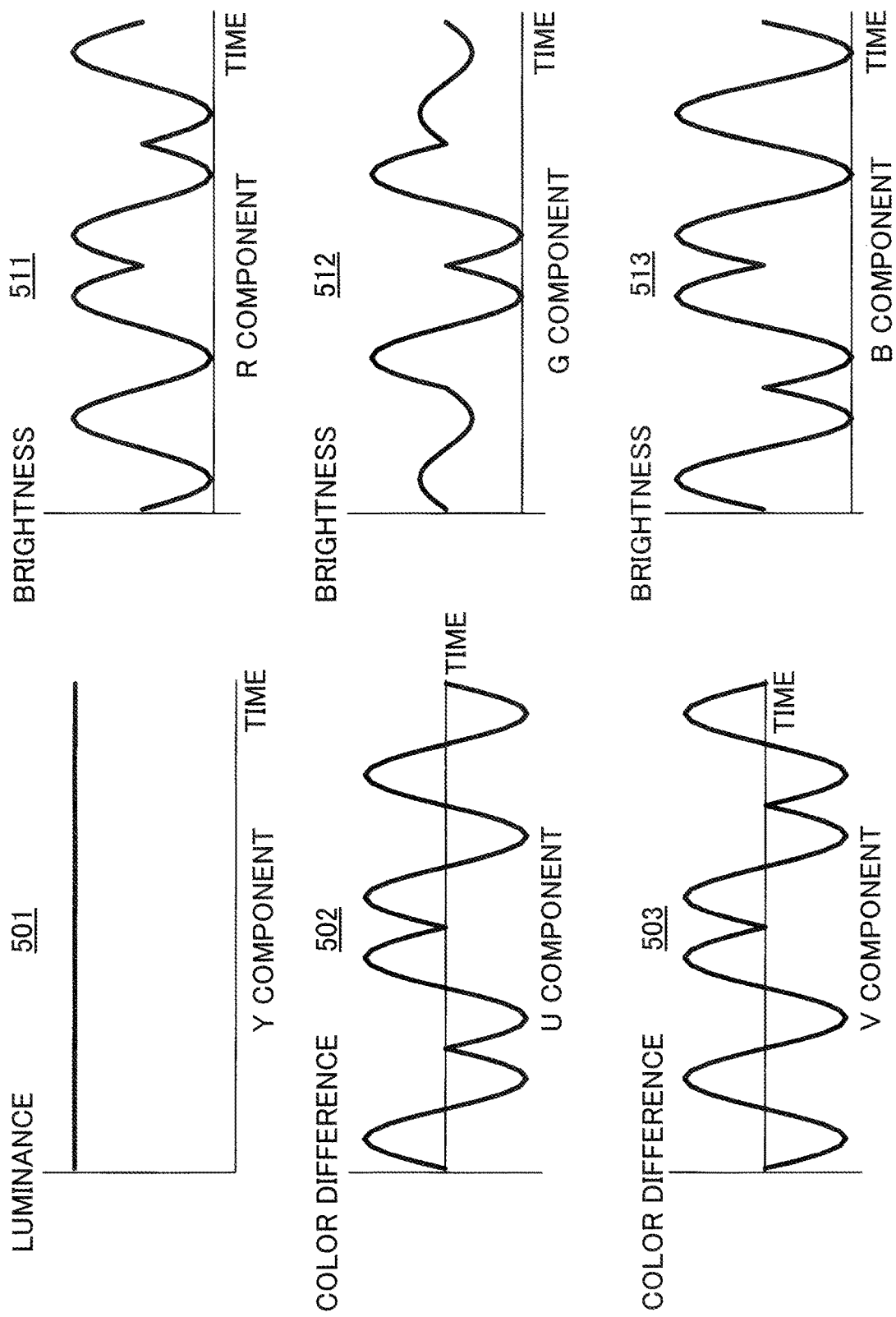
FIG. 5 is a diagram illustrating an example of a relationship between a time change of a value of each of components in a YUV color space and a time change of a value of each of components in a RGB color space according to the light emission pattern.

FIG. 5 is a diagram illustrating an example of a relationship between a temporal change of a value for each of components in a YUV color space and a temporal change of a value for each of components in a RGB color space, in accordance with a light emission pattern, in a case in which the first characteristic of the light, which changes along time series in the light emission pattern, is a luminescent color.

On the left side of FIG. 5, the values of the respective components in the YUV color space according to the light emission pattern are depicted. As depicted in the top graph 501, the Y component, that is, the luminance component is kept constant over time. On the other hand, as shown in the center graph 502, the value of the U component which is one of the color difference components changes with the elapse of time according to the light emission pattern. Similarly, as shown in the bottom graph 503, the value of the V component, which is the other color difference component, also changes with time according to the light emission pattern.

On the other hand, on the right side of FIG. 5, values of respective components in the RGB color space corresponding to the light emission pattern shown on the left side of FIG. 5 are depicted. Graphs 511 to 513 represent time changes of the red component, the green component, and the blue component, respectively. As depicted in the graphs 511 to 513, each color component changes in accordance with the light emission pattern.

In a case in which the first characteristic of the light that changes along the time series in the light emission pattern is a luminescent color, for instance, the light emission pattern modulation section 151 sets a plurality of sampling points (for instance, 10 to 20 points) in one cycle of the light emission pattern.

In a color space in which a luminance component and a color component are expressed independently of each other, such as YUV or HLS, the light emission pattern modulation section 151 obtains the value of the color component at each sampling point when the value of the color component is sinusoidally changed. Moreover, for each sampling point, from the value of the luminance component and the value of the color component in the color space, the light emission pattern modulation section 151 acquires a value of each of components: red, green, and blue in the RGB color space in order to correspond to the luminescent color of each of light emitting elements of the lighting device 14.

The light emission pattern modulation section 151 determines the brightness of the color component emitted from each of light emitting elements according to the value of each of components: red, green and blue, for each sampling point. Preferably, the light emission pattern modulation section 151 keeps the value of the luminance component of the entire light emitted from the lighting device 14 constant.

By the above described functional operations, even if the color of the light emitted from the lighting device 14 changes along the time series according to the light emission pattern, the light quantity per unit time of the light is kept constant. Human vision is relatively sensitive to changes in light intensity; however, relatively insensitive to changes in color.

Therefore, because the amount of light per unit time is maintained at constant, it is possible for the light emission pattern modulation section 151 to make it difficult for a person to perceive that the characteristic of the light from the lighting device 14 change in the time series according to the light emission pattern.

Figure 6:
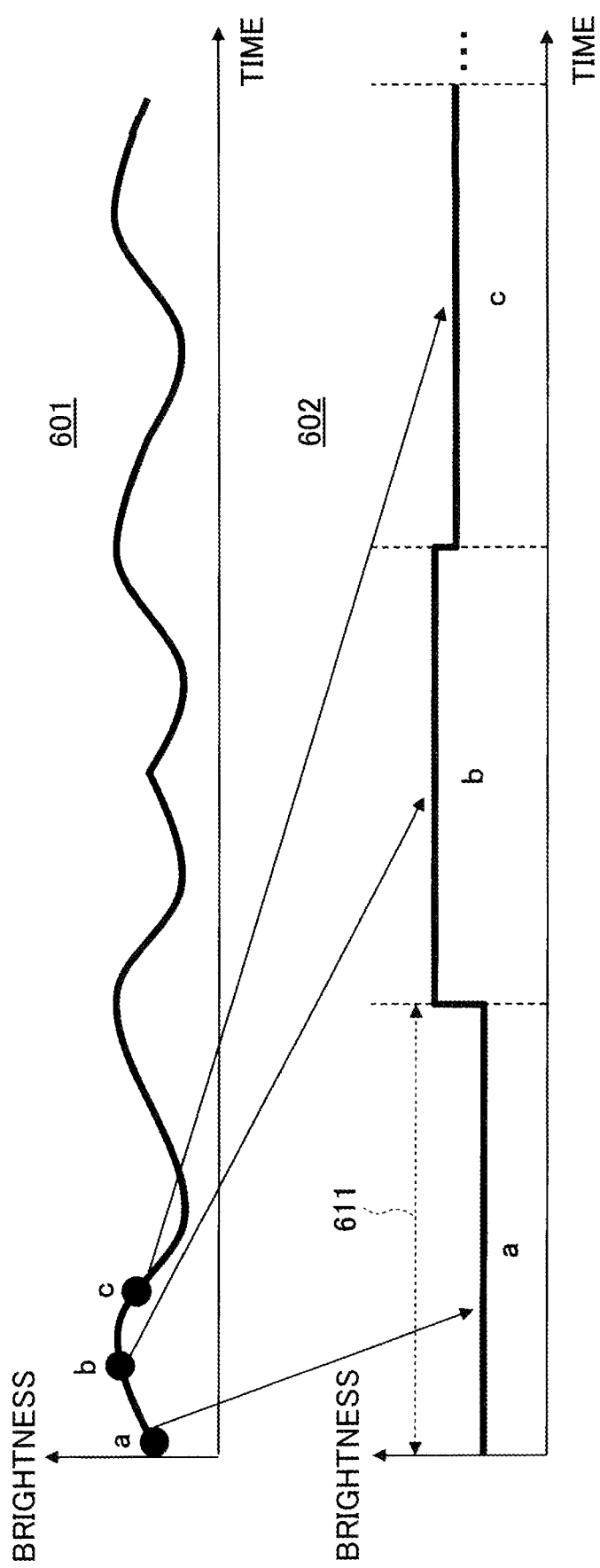
FIG. 6 is a diagram illustrating an example of a temporal change in brightness of one color component according to the light emission pattern.

FIG. 6 is a diagram showing an example of temporal change in brightness of one color component according to the light emission pattern. In FIG. 6, the horizontal axis represents time, and the vertical axis represents brightness. A graph 601 depicted on an upper side, as an example, represents time change of the blue component according to the light emission pattern. In this example, sampling points a, b and c are set in one cycle of the light emission pattern.

A graph 602 depicted at a bottom represents the brightness of the blue component at each sampling point. As depicted in the graph 602, for instance, for each subsection 611 obtained by dividing one cycle of the light emission pattern by the number of sampling points, a blue component is discretely changed to be a blue component value of the sampling point included in the subsection 611.

Also, in a case in which the first characteristic of light modulated according to the light emission pattern is luminance, for instance, the light emission pattern modulation section 151 sets a plurality of sampling points (for instance, 10 to 20 points) in one cycle of the light emission pattern. Then, the light emission pattern modulation section 151 may determine the luminance of the light emitted from the light emitting element of the lighting device 14 at each sampling point according to the light emission pattern.

As described above, for each symbol contained in the information to be transmitted, the light emission pattern modulation section 151 determines the color component value or the luminance emitted by each of the light emitting elements of the lighting device 14 at each of sampling points corresponding to the symbol.

Among the light emitting elements included in the lighting device 14, regarding the light emitting elements not related to the second characteristic to which the pulse modulation is conducted, the light emission pattern modulation section 151 generates a control signal representing a value or luminance of a color component at each of the sampling points for each of symbols, and outputs the control signal to the lighting device 14.

Further, among the light emitting elements included in the lighting device 14, with respect to the light emitting element related to the second characteristic, to which the pulse modulation is conducted, the light emission pattern modulation section 151 indicates to the pulse pattern modulation section 152 the value or the luminance of the color component emitted by the light emitting element at each sampling point.

Similarly to the information transmitted by modulation by the light emission pattern, the pulse pattern modulation section 152 divides information to be transmitted by the pulse modulation into bit string units each having one or more bits, and sets each bit string as one symbol. The pulse pattern modulation section 152 reads data representing a pulse pattern corresponding to the value of the symbol from the storage device 12.

The pulse pattern modulation section 152 performs the pulse modulation to the second characteristic of the light emitted from the lighting device 14 with the pulse pattern according to the value of the symbol and having the second time length for each symbol. In a case in which the symbol represents 1-bit-data, the pulse pattern may be a Manchester code pattern.

Alternatively, if the symbol represents 214 bits of data, the pulse pattern may be a pattern according to 4-pulse-phase-modulation (PPM). Moreover, a second time period may be, for instance, from several hundreds of μsec to 1 msec (that is, a second frequency corresponding to the second time period is 1 kHz to several of kHz).

The pulse pattern modulation section 152 may include a certain symbol string as a preamble at a beginning of information to be transmitted, in a same manner conducted by the light emission pattern modulation section 151. Alternatively, the pulse pattern modulation section 152 may include an error detection code such as a CRC code in the information to be transmitted.

By this manner, in which the pulse pattern modulation section 152 includes the symbol string or the error detection code in the information to be transmitted, it is possible for the receiving device 2 to easily and accurately decode the information transmitted by the pulse pattern.

In the present embodiment, as modulation by the light emission pattern and modulation by the pulse pattern are multiplexed, for each of subsections in modulation by the light emission pattern, the pulse pattern modulation section 152 sets a peak value and a bottom value for the second characteristic of each of pulses included in the subsection.

Hereinafter, the peak value and the bottom value of the second characteristic of the pulse will be simply referred to as the peak value and the bottom value of the pulse, respectively. For instance, to make an average value of the second characteristic in a subsection to be equal to the value of the second characteristic at the sampling point of the light emission pattern included in the subsection for each of the subsections, the pulse pattern modulation section 152 sets the peak value and the bottom value of each of the pulses included in the subsection.

In the following description, it is assumed that the first characteristic of light modulated by the light emission pattern is a color component, and the second characteristic of light, to which the pulse modulation is conducted, is a given color component. However, even if a combination of the first characteristic and the second characteristic is different from the above combination, the pulse pattern modulation section 152 may set the peak value and the bottom value of each of pulses in accordance with the following description.

Figure 7:
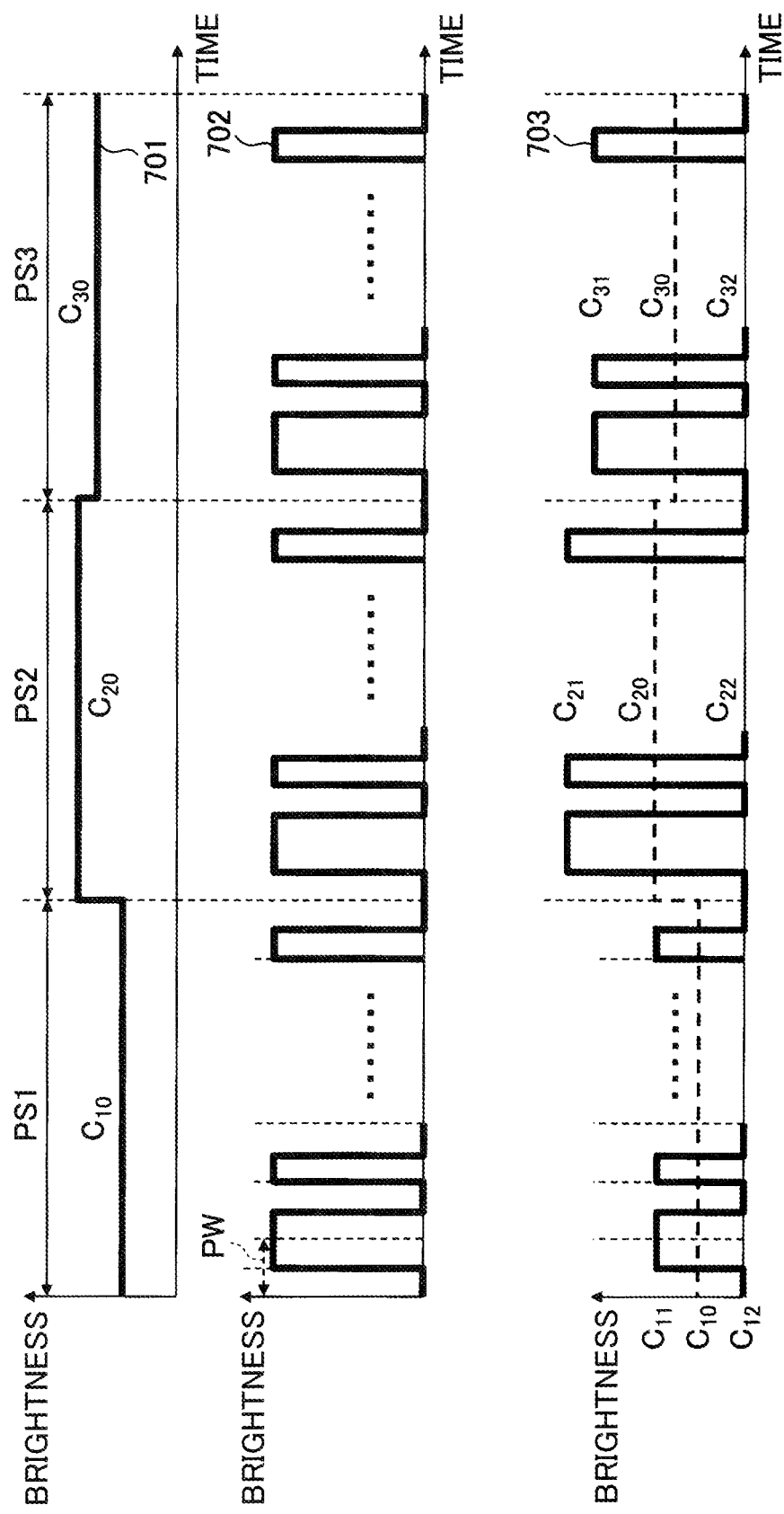
FIG. 7 is a diagram for explaining multiplexing of modulation based on the light emission pattern and a pulse modulation.

FIG. 7 is an explanatory diagram of multiplexing of modulation based on a light emission pattern and pulse modulation. In FIG. 7, the horizontal axis represents time, and the vertical axis represents the brightness of the pulse-modulated color component. In FIG. 7, it is assumed that the blue component is pulse-modulated as an example.

As depicted in a top graph 701, the blue component changes for each of subsections PS1 to PS3 in modulation according to the light emission pattern. In an example depicted in FIG. 7, among the subsections PS1 to PS3, the blue component is the brightest in the subsection PS2, and the blue component is the darkest in the subsection PS1.

Also, as depicted in a second graph 702, the blue component is pulse-modulated with the pulse pattern having a pulse length PW corresponding to a second time period shorter than each of the subsections PS1 to PS3 in accordance with information to be transmitted. In this example, the blue component is pulse-phase modulated by Manchester code. That is, a duration, in which the pulse has a bottom value, and a duration, in which the pulse has a peak value, are the same per symbol.

A bottom graph 703 represents a time change of the blue component, in which the modulation by the light emission pattern and the pulse modulation are multiplexed. For each of the subsections PS1 to PS3, to make an average value of the multiply-modulated blue component in a subsection to be equal to a value of the blue component at the sampling point included in the subsection according to the modulation by the light emission pattern, and a peak value a bottom value are set for each of pulses.

In this example, for each of the pulses, the peak value is set based on the value of the blue component at a sampling point included in a subsection according to the modulation by the light emission pattern in the subsection including the pulse. The bottom value is set to a constant value. Therefore, for each of the pulses, the peak value is set according to the following Equation 1.

$$C_{k0} = \frac{(C_{k1} + C_{k2})}{2} \qquad \text{[Equation 1]}$$
$$C_{k2} \equiv \text{CONSTANT}$$

Here, $C_{k0}$ represents a value of the blue component at a sampling point included in a subsection k according to the modulation by the light emission pattern in the subsection k (k=1, 2, ..., N when N sampling points are set in the first time period). Also, $C_{k1}$ represents a peak value of each of pulses included in the subsection k. $C_{k2}$ represents the bottom value of each pulse included in the subsection k.

Figure 8:
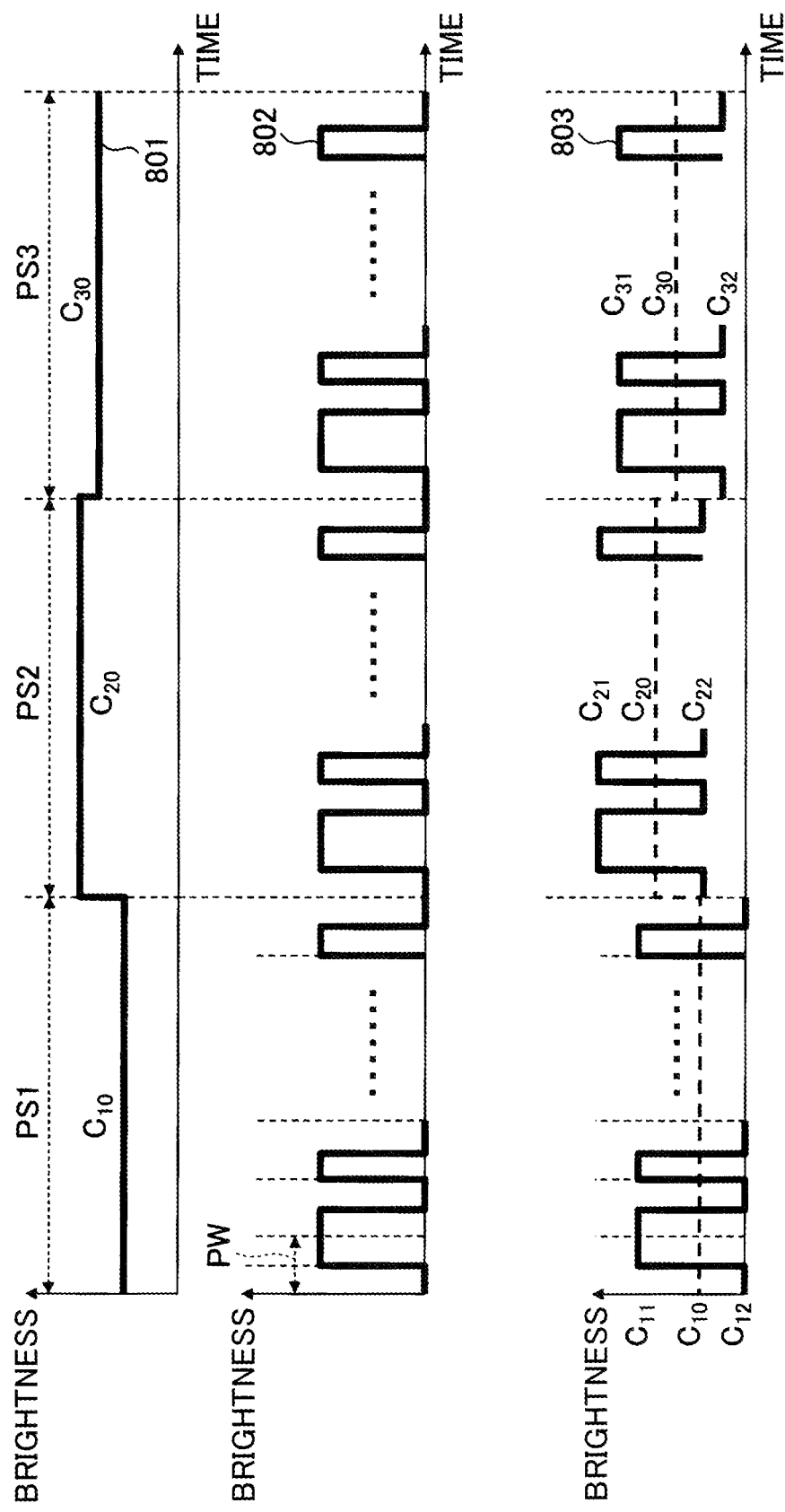
FIG. 8 is a diagram for explaining multiplexing of the modulation by the light emission pattern and the pulse modulation according to a modification.

FIG. 8 is a diagram for explaining multiplexing of modulation by the light emission pattern and the pulse modulation according to a modification.

In this modification, not only the peak value but also the bottom value is adjusted for each of pulses according to the modulation by the light emission pattern, and the amplitude of each pulse is retained as constant. In FIG. 8, a horizontal axis represents time, and a vertical axis represents brightness of a color component to be pulse-modulated. As an example, in FIG. 8, the blue component is pulse-modulated as an example.

Similar to FIG. 7, as depicted in a top graph 801, the blue component changes for each of the subsections PS1 to PS3 in the modulation according to the light emission pattern. Also, as depicted in a second graph 802, the blue component is pulse-phase modulated with the pulse pattern having a pulse length PW corresponding to the second time period shorter than each of the subsections PS1 to PS3 in accordance with information to be transmitted.

A bottom graph 803 represents the time change of the blue component, in which the) modulation by the light emission pattern and the pulse modulation are multiplexed. Also in this example, for each of the subsections PS1 to PS3, the peak value and the bottom value of each pulse are set, to make the average value of the multi-modulated blue component to be equal to the value of the blue component at a sampling point included in the subsection according to the modulation by the light emission pattern.

In this example, the amplitude of each pulse is retained to be constant. Therefore, the peak value and the bottom value of each pulse are set according to the following equation 2.

$$C_{k0} = \frac{(C_{k1} + C_{k2})}{2} \qquad \text{[Equation 2]}$$
$$C_{k1} - C_{k2} \equiv A$$

Here, A is the amplitude of the pulse. According to this modification, because the amplitude of the pulse is retained to be constant regardless of a waveform of the light emission pattern, it is possible for the lighting device 14 to easily specify the pulse pattern superimposed on the light emitted from the lighting device 14.

Figure 9:
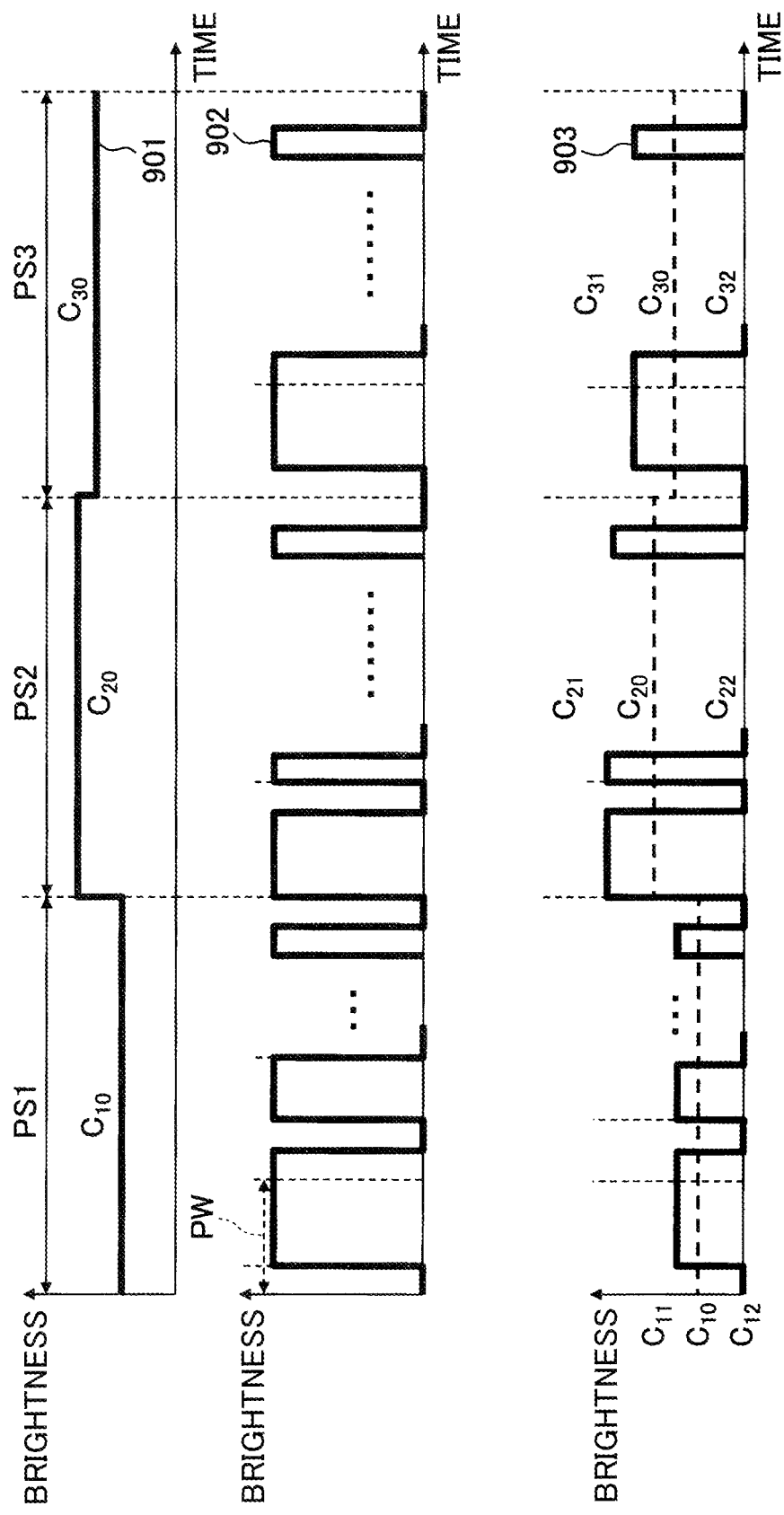
FIG. 9 is an explanatory diagram of multiplexing of modulation by a light emission pattern and pulse modulation according to another modification.

FIG. 9 is a diagram for explaining multiplexing of the modulation by the light emission pattern and the pulse modulation according to another modification. In this modification, light from the lighting device 14 is pulse-phase modulated according to the 4PPM code.

That is, in this example, a pulse period having a second time length PW corresponding to one) symbol is divided into four pulse periods, the pulse attains a bottom value in accordance with a value of the symbol in any one of the four divided pulse periods, and otherwise the pulse attains, a peak value. In FIG. 9, a horizontal axis represents time, and a vertical axis represents brightness of a pulse-modulated color component. Also in FIG. 9, the blue component is pulse-modulated as, an example.

Similar to FIG. 7, as illustrated in a top graph 901, the blue component changes for each of the subsections PS1 to PS3 in the modulation according to the light emission pattern. Also, as illustrated in a second graph 902, the blue component is pulse-phase modulated with the pulse pattern having the second time length PW shorter than each of the subsections PS1 to PS3 according to information to be transmitted.

A bottom graph 903 represents time change of the blue component, in which the modulation by the light emission pattern and the pulse modulation are multiplexed. Also, in this example, for each of the subsections PS1 to PS3, the peak value and the bottom value of each pulse are set, to make an average value of a multiply modulated blue component in a subsection to be equal to a value of the blue component at a sampling point included in the subsection depending on the modulation by the light emission pattern.

In this example, the bottom value of each pulse is retained to be constant. Also, the pulse attains the bottom value at ¼ of the second time length corresponding to one symbol, while the pulse attains the peak value at ¾ of the second time length. Therefore, the peak value and the bottom value of each pulse are set according to the following equation.

$$C_{k0} = \frac{(3C_{k1} + C_{k2})}{4}$$ [Equation 3]

$$C_{k2} \equiv \text{CONSTANT}$$

In a case of using 4PPM, a color component may be pulse-modulated, so that a pulse attains a bottom value at ¾ of the second time length corresponding to one symbol, and the pulse attains) peak value at ¼ of the second time length. In this case, for instance, the peak value and the bottom value of each pulse are set according to the following equation.

$$C_{k0} = \frac{(C_{k1} + 3C_{k2})}{4}$$ [Equation 4]

$$C_{k2} \equiv \text{CONSTANT}$$

Also, in a case of using the 4PPM code, the peak value and the bottom value of each pulse may be set, to make the amplitude of each pulse to be constant.

If the average value of the pulse-modulated color components in each of subsections maintains a waveform corresponding to the light emission pattern, the average value of the pulse-modulated color components in each subsection is not required to coincide with the value of the color component at the sampling point of the light emission pattern included in the subsection.

For instance, for each of the subsections, the peak value and the bottom value of each pulse may be set, to make the average value of the pulse-modulated color component in the subsection to be a given value higher than the value of the color component at the sampling point of the light emission pattern corresponding to the subsection. Moreover, the peak value and the bottom value of each pulse may be set, so that the higher the value of the color component at the sampling point of the light emission pattern included in the subsection, the larger the given value.

Alternatively, for each of the subsections, the peak value and bottom value of each pulse may be set, to make the average value of pulse-modulated color components in the subsection to be a given value lower than the color component value at the sampling point of the light emission pattern included in the subsection. As described above, even in a case in which the peak value and bottom value of each pulse are set, because the waveform of the light emission pattern is maintained, it is possible for the receiving device 2 to decode the transmitted information by demodulating the light modulated by the light emission pattern.

For each of the symbols, the pulse pattern modulation section 152 generates a control signal for causing the second characteristic value to be the peak value or the bottom value of the pulse, which is set, in the pulse pattern in accordance with a value of a symbol, and outputs the control signal to the lighting device 14.

Figure 10:
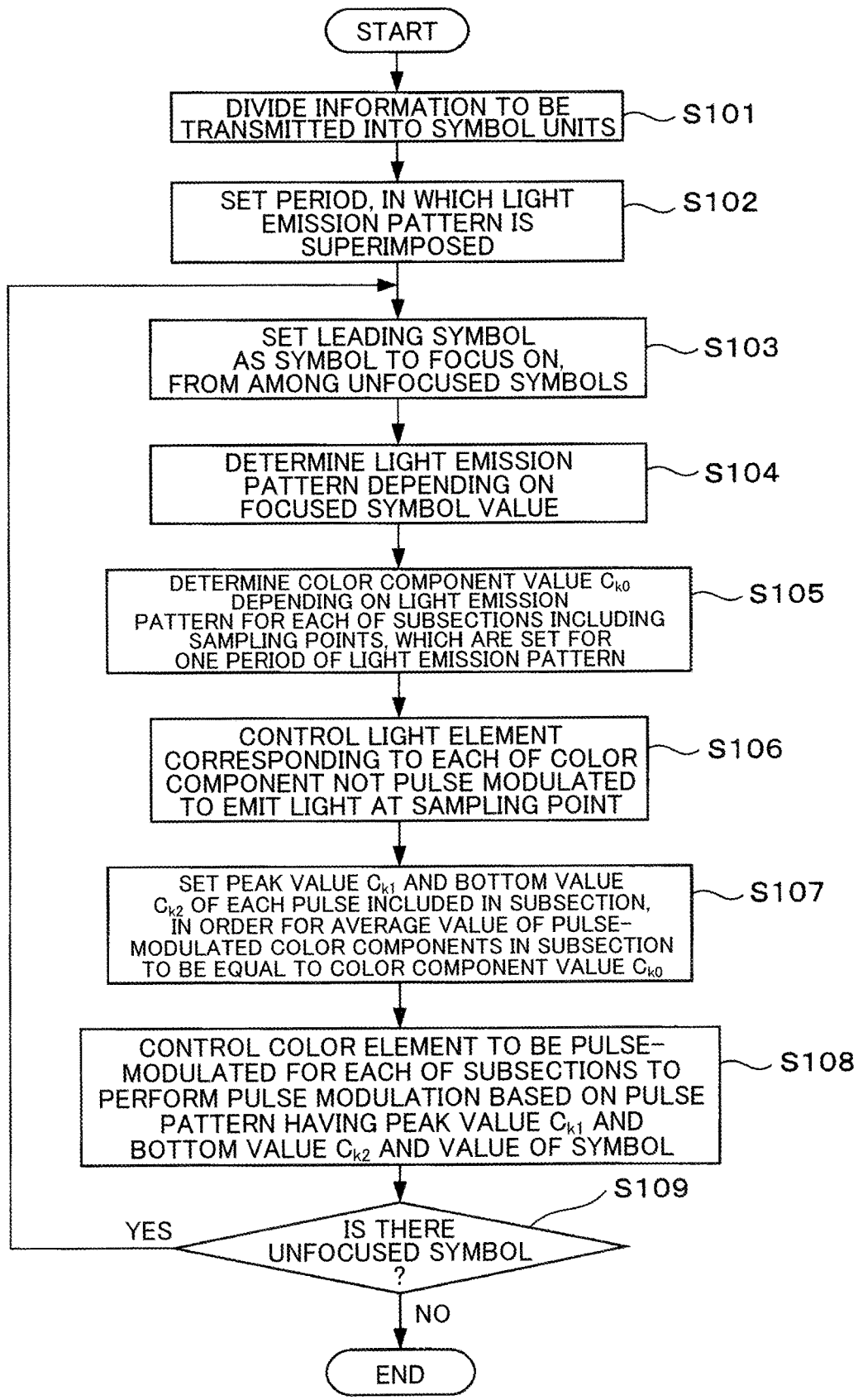
FIG. 10 is flowchart for explaining an operation of a transmission process by a transmitting device.

FIG. 10 is a flowchart for explaining an operation of the transmission process by the transmitting device 1. The light emission pattern modulation section 151 of the control device 15 in the transmitting device 1 divides information to be transmitted into symbol units (step S101).

For each symbol, the light emission pattern modulation section 151 sets a period, in which the light emission pattern is superimposed (step S102). Also, the light emission pattern modulation section 151 selects a leading symbol as a symbol to focus on, from among unfocused symbols included in the information to be transmitted (step S103). Then, the light emission pattern modulation section 151 determines a light emission pattern depending on the focused symbol value (step S104).

The light emission pattern modulation section 151 sets a plurality of sampling points in a period having the first time length, and determines the color component value $C_{k0}$ for each of the light emitting elements of the lighting device 14 depending on the light emission pattern for each of subsections including sampling points (step S105).

For each subsection, the light emission pattern modulation section 151 generates a control signal for causing a light emitting element corresponding to a color component value at each of sampling points included in the subsection to emit light for each of color sections, which are not pulse-modulated, and outputs the control signal to the lighting device 14 (step S106).

Also, the pulse pattern modulation section 152 sets the peak value $C_{k1}$ and the bottom value $C_{k2}$ of each pulse included in the subsection, to make the average value of the pulse-modulated color components in the subsection to be equal to the color component value $C_{k0}$ at the sampling points for each of the subsections (step S107).

For color components to be pulse modulated, based on the pulse pattern having the second time length corresponding to the peak value $C_{k1}$ and the bottom value $C_{k2}$ of each pulse set for each of the subsections, and the value for each of the symbols, the pulse pattern modulation section 152 generates the control signal to perform the pulse modulation. The pulse pattern modulation section 152 outputs the control signal to the lighting device 14 (step S108).

The control device 15 determines whether there is any unfocused symbol, which is not set as the focused symbol (step S109). If an unfocused symbol remains (Yes in step S109), the control device 15 repeats the described above process from step S103. If no unfocused symbol remains (No in step S109), the control device 15 ends the transmission process.

Figure 11:
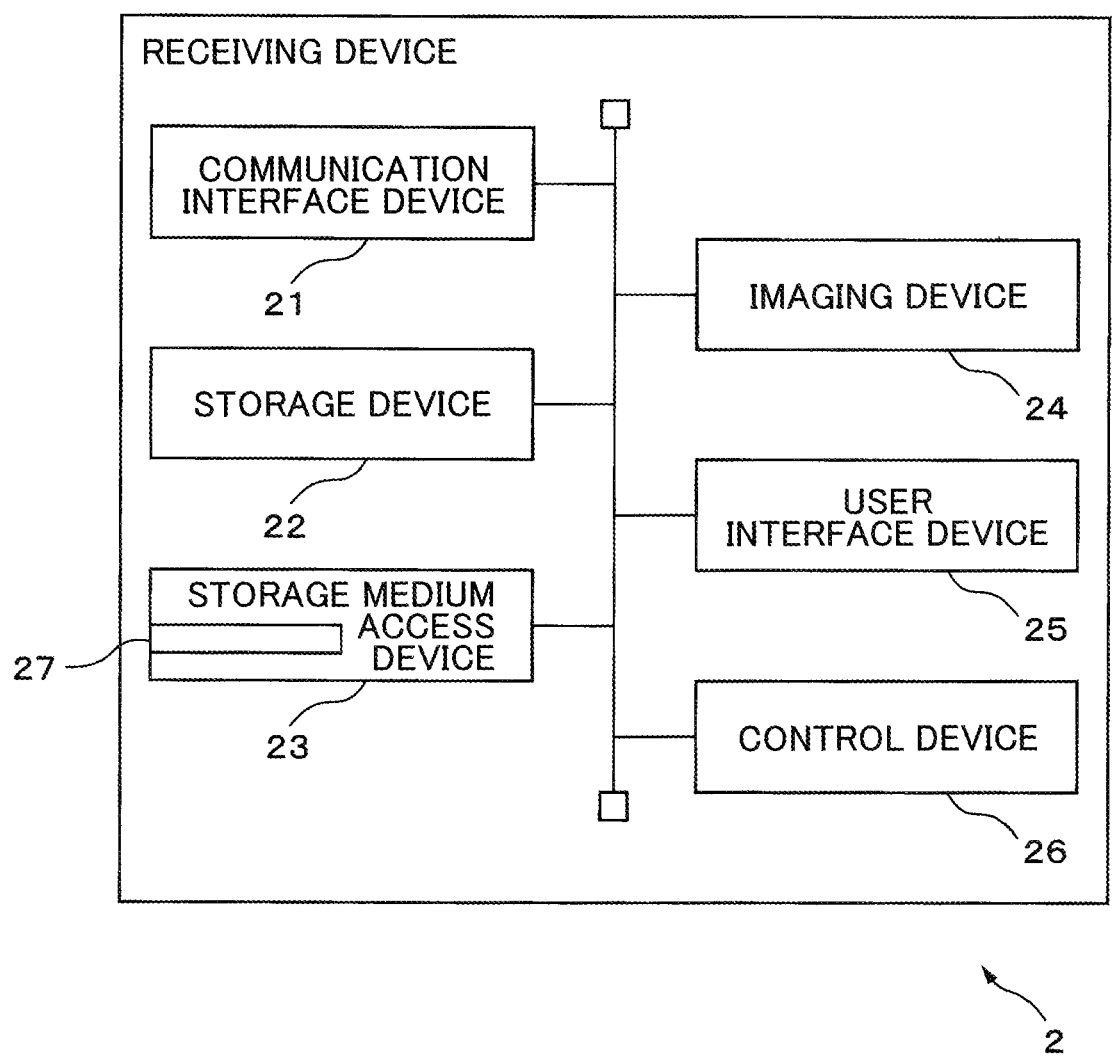
FIG. 11 is a diagram illustrating a hardware configuration of a receiving device used in a communication system depicted in FIG. 1.

Next, the receiving device 2 will be described. FIG. 11 is a hardware configuration diagram of the receiving device. For instance, the receiving device 2 may be a portable terminal including an imaging device or a stationary device.

The receiving device 2 includes a communication interface device 21, a storage device 22, a storage medium access device 23, an imaging device 24, a user interface device 25, and a control device 26. With respect to an imaging range including at least a part of an area irradiated with the light from the transmitting device 1, the receiving device 2 analyzes a plurality of images obtained by imaging a plurality of times in time series at a certain imaging rate by the imaging device 24, so as to decode information transmitted by the transmitting device 1.

For instance, the communication interface device 21 includes a communication interface for connecting the receiving device 2 to a wired or wireless communication network and a control circuit thereof. The communication interface device 21 transmits information received from the control device 26 to another device, for instance, a server via the communication network. The communication interface device 21 also passes information received from another device to the control device 26.

For instance, the storage device 22 includes a read-only nonvolatile semiconductor memory and a readable and writable volatile semiconductor memory. The storage device 22 stores, for instance, a plurality of images generated in time series by the imaging device 24 during an execution of a receiving process. The storage device 22 also stores various information items and programs used by the control device 26 to perform the receiving process. Furthermore, the storage device 22 may store information transmitted and decoded by the transmitting device 1.

For instance, the storage medium access device 23 is a device that accesses the storage medium 27 such as a magnetic disk, a semiconductor memory card, or an optical storage medium. The storage medium access device 23 reads, for instance, a computer program for the receiving process, which is stored in the storage medium 27 and executed on the control device 26, and sends the read computer program to the control device 26.

The imaging device 24 includes, for instance, an image sensor formed by a two-dimensional array of solid-state imaging devices having sensitivity to light emitted from the lighting device 14 of the transmitting device 1, such as CCD or CMOS, and an imaging optical system, which forms an image of the imaging range on the image sensor. Note that, in order for at least a part of the area irradiated with the light from the lighting device 14 of the transmitting device 1 to be included in an imaging range, with the object 3 depicted in FIG. 1 being included in the imaging range, the receiving device 2 is preferably arranged, for instance.

While the receiving device 2 is performing the receiving process, the imaging device 24 captures an image at the certain imaging rate, and generates an image at every time of capturing the image. When the first characteristic value or the second characteristic value relates to color, the image generated by the imaging device 24 is preferably a color image.

Also, for instance, in the imaging device 24, a rolling shutter method, or an exposure method capable of realizing a high shutter speed compatible with pulse modulation may be adopted; alternatively, an exposure method, which does not support a pulse modulation, may be adopted.

In a case in which the imaging device 24 adopts the exposure method compatible with the pulse modulation and restores information superimposed on light by the pulse modulation, the certain imaging rate may be, for instance, an imaging rate corresponding to a time period equal to or less than a half the second time length. If it is sufficient to restore the information superimposed on the light by modulation by the light emission pattern, the certain imaging rate may be, for instance, an imaging rate corresponding to a time period equal to or less than a half the first time length.

The imaging device 24 outputs an image to the control device 26 each time the image is generated.

For instance, the user interface device 25 includes a device such as a touch panel display for allowing a person to operate the receiving device 2 or for the receiving device 2 to display information to a person. The user interface device 25 outputs, to the control device 26, an operation signal corresponding to an operation of the person, for instance, an operation signal instructing start of the receiving process.

Also, the user interface device 25 displays various types of information items received from the control device 26 and an image generated by the imaging device 24. For instance, the user interface device 25 may display, together with the image generated by the imaging device 24, information transmitted from the transmitting device 1 decoded by the receiving process.

The control device 26 includes one or more processors and their peripheral circuits. The control device 26 controls the entire receiving device 2. Moreover, the control device 26 causes the imaging device 24 to perform a frequency analysis with respect to a plurality of images generated in time series, and decodes information transmitted from the transmitting device 1.

Figure 12:
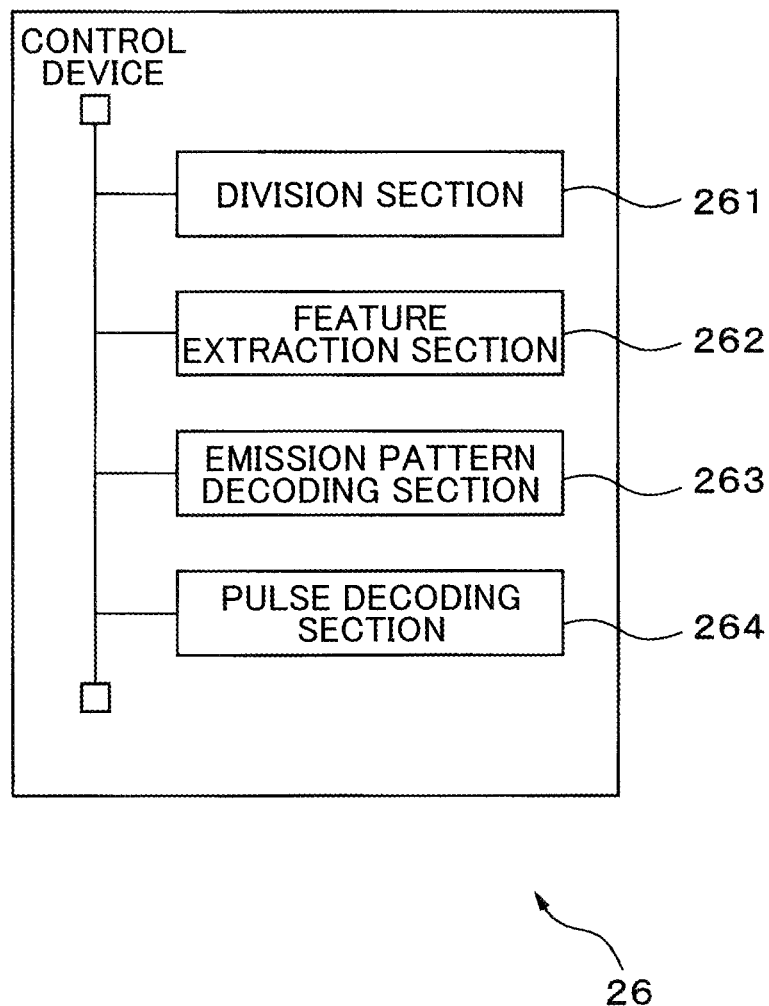
FIG. 12 is a diagram illustrating a functional configuration of a control device related to the receiving device.

FIG. 12 is a functional block diagram of the control device related to the receiving process. The control device 26 includes a division section 261, a feature extraction section 262, a light emission pattern decoding section 263, and a pulse decoding section 264. These sections included in the control device 26 are, for instance, software modules implemented by computer programs operating on a processor included in the control device 26. Alternatively, these sections included in the control device 26 may be implemented in the receiving device 2 as firmware, which implements functions of the sections.

Alternatively, for instance, these sections of the control device 26 may be implemented as a web application operating on a web browser. In a case in which the imaging device 24 adopts an exposure method not supporting the pulse modulation, the pulse decoding section 264 may be omitted. In addition, in the case in which the imaging device 24 adopts an exposure method supporting the pulse modulation, the light emission pattern decoding section 263 may be omitted.

Figure 13:
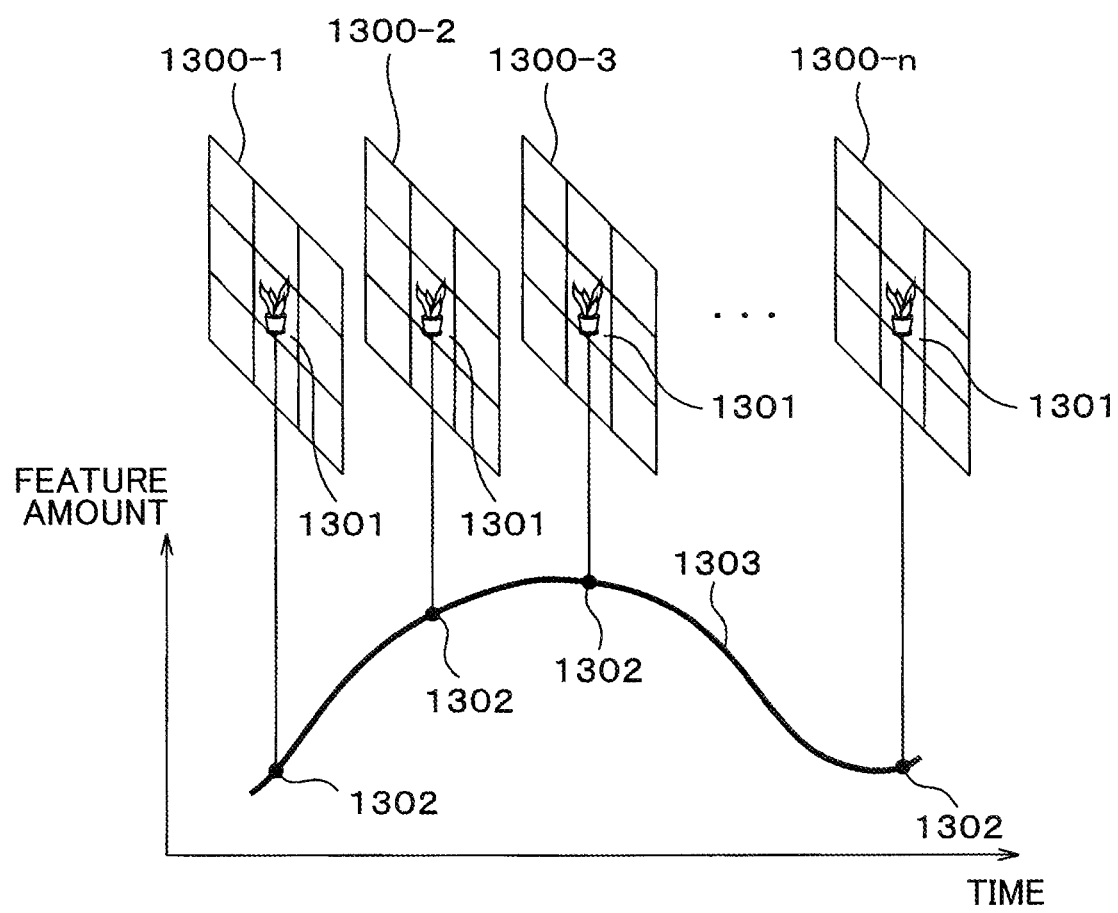
FIG. 13 is a conceptual diagram of reception processing for information superimposed by the light emission pattern.

FIG. 13 is a conceptual diagram of the receiving process for information superimposed by the light emission pattern. Assuming that an object illuminated by light from the lighting device 14 of the transmitting device 1 appears in each image generated by the imaging device 24, pixel values included in an area, in which the object appears, are affected by a change of the first characteristic of the light emitted by the lighting device 14.

If a shutter speed at a time of capturing by the imaging device 24 is longer than the second time length, pixel values included in an area in which the object appears are values corresponding to an integral of a light quantity from the lighting device 14 over a period, in which a shutter is open.

Therefore, each of images 1300-1, 1300-2, 1300-3, . . . , 1300-*n* generated by the imaging device 24 is divided into a plurality of partial areas 1301. Then, a feature quantity 1302 representing the first characteristic of the light emitted from the lighting device 14 is extracted from each partial area, and the light emission pattern 1303 is specified by examining a time change of the feature quantity 1302. Therefore, it is possible for the receiving device 2 to decode the value of the symbol corresponding to the light emission pattern 1303.

Figure 14:
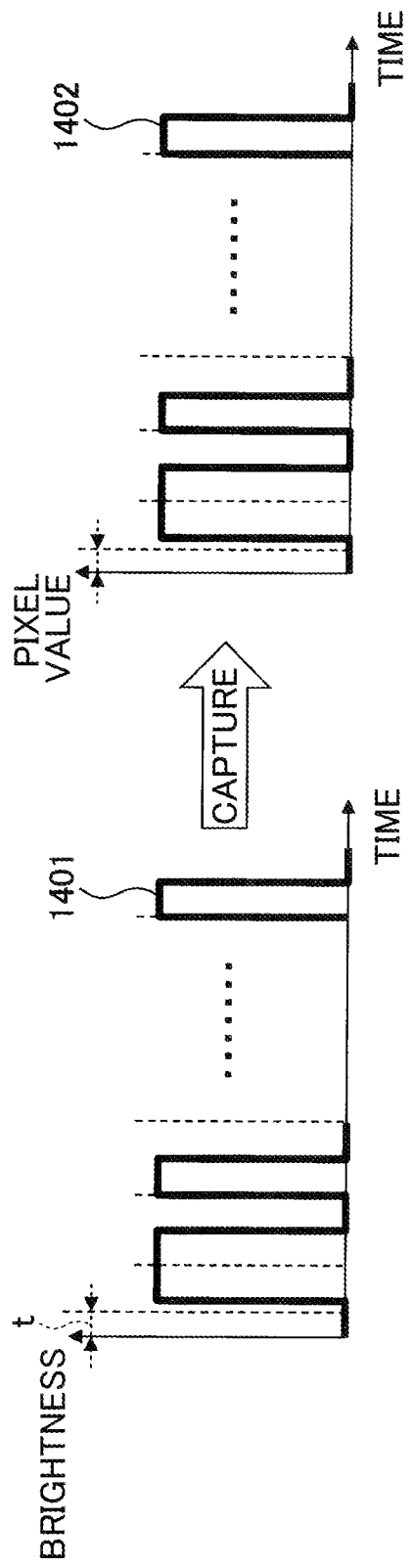
FIG. 14 is a conceptual diagram illustrating a receiving process for information superimposed by pulse modulation.

FIG. 14 is a conceptual diagram of the receiving process for information superimposed by pulse modulation. In FIG. 14, a horizontal axis represents time. Also, in a graph 1401 on a left side, a vertical axis represents brightness of pulse-modulated color component. In a graph 1402 on a right side, a vertical axis represents a pixel value. As depicted in a graph 1401, it is assumed that any color component of light emitted by the lighting device 14 is pulse-modulated.

In this case, when the imaging device 24 performs capturing at a cycle t equal to or less than a pulse width for each of pulses, as depicted in the graph 1402, the pulse-modulated color component of each of the pixel values in a partial area, in which the object illuminated by light emitted from the lighting device 14 is reflected, also changes in time series. Accordingly, the pulse pattern is specified by examining a time change of the pulse-modulated color component among the pixel values, and the receiving device 2 is able to decode the value of the symbol corresponding to the pulse pattern.

The dividing section 261 divides each image into a plurality of partial areas. For instance, the dividing section 261 may divide each image into 2 to 4 in each of a horizontal direction and a vertical direction. The dividing section 261 may divide each image by a plurality of dividing methods. For instance, the dividing section 261 may divide each image into two in each of the horizontal direction and the vertical direction and set four partial areas for each image, and also, may divide each image into three in each of the horizontal direction and the vertical direction and set nine partial areas for each image.

By dividing the image, it is possible to set the partial areas at high probability, in which the object illuminated by the light from the transmitting device 1 or the lighting device 14 of the transmitting device 1 itself occupies most of a partial area in any of partial areas. The division section 261 passes information (for instance, the position of the boundary between partial areas) representing each partial area of each image to the feature extraction section 262.

The feature extraction section 262 extracts, from each of partial areas for each image, a feature amount representing a first characteristic of light, which changes in time series according to the light emission pattern of light emitted from the lighting device 14 of the transmitting device 1. For instance, when the first characteristic of light changing in the time series is luminance, the feature extraction section 262 extracts an average value or a median value of luminance values of pixels in each partial area as a feature amount.

Moreover, when the second characteristic of light changing in the time series is a luminescent color, the feature extraction section 262 converts a value of each of pixels in each partial area into a value of YUV color space or HLS color space, and calculates an average value or a median value of the color component (for instance, a U component, a V component, or a hue) of each pixel as a feature amount. In a case in which the value of each pixel of the image obtained by the imaging device 24 is represented in the RGB color space, the feature extraction section 262 calculates the average value or the median value of the color components by converting the value of each pixel of the image into the value of the YUV color space or the HLS color space.

Note that the feature amount is not limited to the above described example, and the feature extraction section 262 may extract various feature amounts changing in the time series according to the first characteristic of light changing according to the light emission pattern; for instance, a luminance value in the partial area, or a sum, variance, or standard deviation of a specific color component may be extracted as the feature amount. Alternatively, the feature extraction section 262 may extract, as a feature amount within a partial area, an average value of difference values between pixel values of pixels located at a same position between two temporally consecutive images.

In a case in which the imaging device 24 adopts an exposure method corresponding to the pulse modulation and generates an image at an imaging cycle being shorter than ½ the second time length (if the 4PPM method is adopted, ¼ of the second time cycle), the pixel value of each image is affected by pulse modulation. Therefore, the feature extraction section 262 may generate, for each of the sections having a certain time length, a composite image by calculating an average value of pixel values between corresponding pixels for a plurality of images included in the section. Then, the feature extraction section 262 may extract the feature amount from each of the partial areas in each composite image by performing the above-described process on a plurality of composite images arranged in time series.

In order to reduce effect due to the pulse modulation and not to lose information pertinent to a waveform of the light emission pattern, for instance, it is preferable that the certain time length is set to be a time length equal to or more than twice the second time length and equal to or less than a half a cycle of the light emission pattern (that is, the first time length).

Also, in the case in which the imaging device 24 adopts an exposure method corresponding to the pulse modulation and generates an image at a imaging cycle shorter than a pulse width, the feature extraction section 262 extracts the feature amount representing the pulse modulation from each of the partial areas in each of the images. For instance, in a case in which a specific color component of light emitted from the lighting device 14 is pulse-modulated, the feature extraction section 262 extracts, for each image, an average value of a specific color component with respect to pixels included in a partial area for each of partial areas as the feature amount representing the pulse modulation.

The feature extraction section 262 sends the feature amount regarding the light emission pattern for each of the partial areas in each image to the light emission pattern decoding section 263, and sends the feature amount regarding the pulse modulation to the pulse decoding section 264.

The light emission pattern decoding section 263 specifies the light emission pattern from a change of the feature amount in time series order extracted for each of the partial areas, and decodes a value of the symbol corresponding to the light emission pattern.

As described above, in a case in which a characteristic of the light emitted from the lighting device 14 of the transmitting device 1 periodically fluctuates according to the light emission pattern, a temporal variation of the feature amount of the partial area, in which the object illuminated by the transmitting device 1 is captured, includes a frequency component in a time axis direction according to a variation cycle of the light emission pattern. For instance, as described above, in a case in which the characteristic of the light from the transmitting device 1 changes sinusoidally, the frequency component of the feature amount in the time axis direction includes a specific frequency component corresponding to a sine wave.

Accordingly, for a plurality of images included in a focused period of the same length as a period corresponding to one symbol, the light emission pattern decoding section 263 creates a one-dimensional vector by arranging feature amounts extracted from a partial area in the time series order for each of the partial areas, in which the same object is captured. In a case in which the receiving device 2 is stationary and there is a stationary object in an imaging range of the receiving device 2, a partial area where the same object appears in a plurality of images may be regarded as a partial area at the same position on the image.

The light emission pattern decoding section 263 performs Fourier-transformation with respect to the one-dimensional vector. Then, the light emission pattern decoding section 263 extracts a spectrum having the same frequency as the period of the light emission pattern from the obtained frequency components for each of the partial areas.

The light emission pattern decoding section 263 selects a partial area where an amplitude level of the extracted spectrum is the largest among the partial areas. Alternatively, the light emission pattern decoding section 263 may select a partial area where the amplitude level of the extracted spectrum is equal to or higher than a given threshold. By this operation, the light emission pattern decoding section 263 is able to select the partial area, in which the object illuminated by the transmitting device 1 or the lighting device 14 of the transmitting device 1 is captured.

Then, the light emission pattern decoding section 263 detects a component having a value according to the light emission pattern from the extracted spectrum for the selected partial area. For instance, the component having a value corresponding to the light emission pattern is a phase or an amplitude level of a periodic fluctuation of a light characteristic at a specified time in the focus period (for instance, a start time or an end time of the focus period).

Note that the period set by the transmitting device 1 for every symbol may be shifted from the focused period. The light emission pattern decoding section 263 performs the above described process while shifting the focus period by one frame along the time series, and detects a component having a value according to the light emission pattern for each focus period.

In this case, if the focused period matches the period set by the transmitting device 1 for each symbol, because the value of the detected component is an extreme value, the light emission pattern decoding section 263 may set the extreme value as the component having the value according to the light emission pattern. Once the extreme value is obtained, it is considered that the focused period corresponding to the extreme value matches the period corresponding to one symbol, and the light emission pattern decoding section 263 may set a subsequent focusing period by regarding the focusing period as a reference.

Then, the light emission pattern decoding section 263 detects the component having the value according to the light emission pattern, for each focused period. The light emission pattern decoding section 263 may specify the light emission pattern by a method other than the above method. For instance, the light emission pattern decoding section 263 obtains a difference value of the feature amount between temporally adjacent images within the focused period, and the light emission pattern may be specified by examining an increase and a decrease of the feature amount based on the difference value.

The light emission pattern decoding section 263 arranges the detected components in the time series. As described above, in a case in which information to be transmitted includes a certain symbol string (for example, '01010101') as the preamble, the light emission pattern decoding section 263 extracts, from an arrangement of the detected components, a portion matching a symbol string corresponding to the preamble. Then, the light emission pattern decoding section 263 may associate the detected component with the symbol value in order for the component detected in the extracted portion and the symbol value to match with each other.

Alternatively, in a case in which the light emission pattern decoding section 263 includes an error detection code such as the CRC code in information to be transmitted, the detected component may be associated with the symbol value so as to minimize the symbol error using the error detection code. Alternatively, the light emission pattern decoding section 263 may obtain the value of the symbol according to the detected component with reference to a reference table indicating a correspondence between the detected component and the value of the symbol. The reference table is stored, for example, in the storage device 22 in advance.

The light emission pattern decoding section 263 decodes the transmitted information by arranging values of the decoded symbols in a given order, for example, in an order of time. Then, the light emission pattern decoding section 263 stores the decoded information in the storage device 22.

The pulse decoding section 264 decodes information superimposed on the light emitted from the lighting device 14 of the transmitting device 1 by the pulse modulation, based on the feature amount related to the pulse modulation for each of partial areas in each image.

For example, the pulse decoding section 264 calculates, for each of partial areas, a difference between a maximum value and a minimum value of the obtained feature amounts, and determines that a partial area having the difference being equal to or more than a certain value is the partial area capturing the object illuminated by the light emitted from the lighting device 14. Then, the pulse decoding section 264 calculates an average value of feature amounts for each of sections having a certain time length, with respect to a partial area capturing the object illuminated by the light emitted from the lighting device 14.

For instance, it is preferable that the certain time length is longer than the second time length and shorter than or equal to a length of a subsection set in one cycle of the light emission pattern with respect to the modulation by the light emission pattern. Thus, even if the peak value and the bottom value of each pulse change in response to the light emission pattern, the pulse decoding section 264 is able to specify each pulse. Then, the pulse decoding section 264 associates a feature amount higher than the average value with the peak value of the pulse, and associates a feature amount lower than the average value with the bottom value of the pulse.

The pulse decoding section 264 may specify a superimposed pulse pattern, according to a pattern of a time change of each of the peak value and the bottom value of the pulse. Then, the reference table representing the relationship between the pulse pattern and the value of the symbol is stored in advance in the storage device 22, and the pulse decoding section 264 may specify the value of the symbol corresponding to the pulse pattern by referring to the reference table.

The pulse decoding section 264 decodes the transmitted information by arranging the values of the decoded symbols in a given order, for example, in time order. As described above, in a case in which the information to be transmitted includes a certain symbol string as a preamble, the pulse decoding section 264 extracts, from a sequence of the detected components, a portion that matches the certain symbol string corresponding to the preamble.

Then, the pulse decoding section 264 may associate the detected component with the symbol value in order to match the component detected in the extracted portion and the symbol value with each other. Alternatively, in a case in which information to be transmitted includes an error detection code such as the CRC code, the pulse decoding section 264 may associate the detected component with the value of the symbol, in order to minimize the symbol error using the error detection code. Then, the pulse decoding section 264 stores the decoded information in the storage device 22.

The control device 26 outputs the decoded information to another device via the communication interface device 21. Alternatively, the control device 26 executes a process corresponding to the decoded information. For instance, if the decrypted information is information instructing a start of a certain application, the control device 26 starts the application. Alternatively, the control device 26 may cause the user interface device 25 to display the decrypted information.

In a case in which information superimposed by the modulation by the light emission pattern is the same as information superimposed by the pulse modulation, the control device 26 may perform the above process on one of information decoded by the light emission pattern decoding section 263 and information decoded by the pulse decoding section 264.

Figure 15:
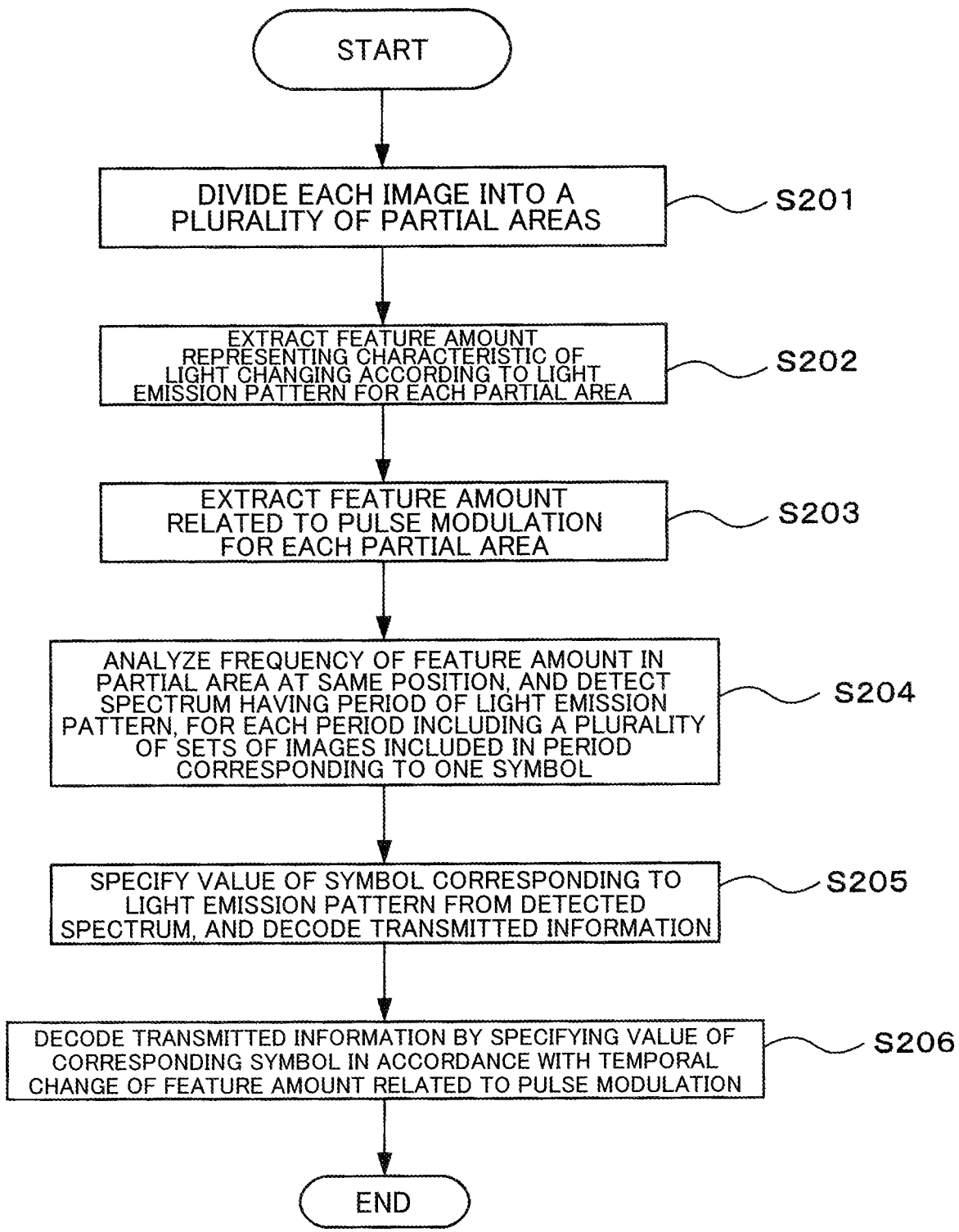
FIG. 15 is a flowchart for explaining an operation of the receiving process by the reception device.

FIG. 15 is a flowchart for explaining an operation of the reception process performed by the receiving device 2. The dividing section 261 of the control device 26 divides each image into a plurality of partial areas (step S201). Then, the feature extraction section 262 of the control device 26 extracts a feature amount representing the first characteristic of the light changing according to the light emission pattern for each partial area (step S202). Moreover, the feature extraction section 262 extracts a feature amount related to the pulse modulation for each partial area (step S203).

For each period including a plurality of sets of images included in a period corresponding to one symbol, the light emission pattern decoding section 263 analyzes a frequency of the feature amount related to the light emission pattern of the partial area at the same position, and detects a spectrum having a period of the light emission pattern (step S204). Then, the light emission pattern decoding section 263 specifies, for each period, the value of the symbol corresponding to the light emission pattern from the detected spectrum, and decodes the transmitted information (step S205).

In the meanwhile, the pulse decoding section 264 decodes the transmitted information by specifying the value of a corresponding symbol in accordance with a temporal change of the feature amount related to the pulse modulation (step S206). Then, the control device 26 ends the reception process.

As described above, in this communication system, it is possible to superimpose information on light emitted by a transmitting device and transmit the light to a receiving device. The transmitting device superimposes the information on the light emitted by the transmitting device by making a light emission pattern changing in time series different in accordance with a value of a symbol, and also, superimposes the information by pulse-modulating the light emitted from the transmitting device at a cycle shorter than the light emission pattern.

Therefore, if the imaging device of the receiving device adopts an exposure method supporting the pulse modulation, the receiving device decodes the information transmitted by demodulating the pulse-modulated light. In the meanwhile, in a case in which the imaging device of the receiving device employs an exposure method not supporting the pulse modulation, the receiving device decodes the transmitted information by demodulating the light modulated by the light emission pattern.

As described above, this communication system is able to transmit information from the transmitting device to the receiving device regardless of the exposure method of the imaging device of the receiving device. Moreover, because a period of the modulation by the pulse modulation is shorter than a period of the modulation by the light emission pattern, in a case in which an imaging device of the receiving device adopts an exposure method supporting the pulse modulation, this communication system is able to transmit information from the transmitting device to the receiving device in a shorter time.

According to the modification, information superimposed on light emitted by the lighting device 14 by the modulation by the light emission pattern and information superimposed on the light emitted by the lighting device 14 by pulse modulation may be different from each other. In this case, for instance, the transmitting device 1 may superimpose information having a relatively high degree of importance on the light emitted from the lighting device 14 by the modulation according to the light emission pattern, and may superimpose information having a relatively low degree of importance on the light emitted by the lighting device 14 by pulse modulation.

Also, according to another modification, different information may be superimposed by the pulse modulation for each of color components of light emitted by the lighting device 14. In this case, the feature extraction section 262 and the pulse decoding section 264 of the control device 26 of the receiving device 2 may execute the processing according to the above described embodiment or the modification for each of the color components. According to this modification, because different information is superimposed for each color component, it is possible to improve transmission efficiency.

According to another modification, the control device 15 of the transmitting device 1 may modulate a pulse frequency of the light emitted from the lighting device 14 according to a value of a symbol to be transmitted. In this case, in each of the subsections obtained by dividing one cycle of the modulation by the light emission pattern, because a length of time, for which the pulse has a peak value, is equal to a length of time, for which the pulse has a bottom value, the peak value and the bottom value of each pulse may be set according to Equation 1 or 2.

In this case, the pulse decoding section 264 of the receiving device 2 may decode information superimposed on light by the pulse modulation by performing a frequency analysis on the feature amount related to the pulse modulation arranged in the time series, similar to the light emission pattern decoding section 263.

In the above embodiment or modification, the receiving device may include a terminal having an imaging device, and another device such as a server connected to the terminal via a communication network. In this case, every time the terminal generates an image, the terminal may transmit an image to the server via the communication network together with identification information for specifying the terminal, for example, an IP address of the terminal.

Moreover, a processor of a server may perform each process of the control device of the receiving device by the above-described embodiment, and may decode information transmitted from the transmitting device. Furthermore, the server may return the decoded information to the terminal with reference to the identification information for identifying the terminal.

Alternatively, each time a processor included in the terminal generates an image, the processor may perform the process of the division section 261 and the process of the feature extraction section 262 on the image to extract the feature amount for each partial area.

Then, the terminal may transmit the feature amount of each of partial areas extracted from each image to the server via the communication network together with the identification information for specifying the terminal. The processor of the server may execute the processes of the light emission pattern decoding section 263 and the pulse decoding section 264 of the receiving device according to the above embodiment to decode the information transmitted from the transmitting device.

The transmission device disclosed in the present specification is able to transmit information to the reception device regardless of the exposure method of the camera included in the reception device that receives the light on which the information is superimposed.

Furthermore, a computer program, which causes a computer to realize functions of the control device of the transmitting device according to the above-described embodiment, may be provided by being recorded in a computer-readable medium. Similarly, a computer program, which causes a computer to realize functions of the control device of the receiving device according to the above embodiment, may be provided by being recorded in a computer readable medium.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting device, comprising:
a lighting device capable of changing a first characteristic and a second characteristic of light to be emitted along time series; and
a processor configured to
control, in a period having a first time length, the lighting device to modulate the first characteristic of the light emitted from the lighting device in the time series in accordance with a light emission pattern having a waveform according to information to be transmitted and having the first time length,
set a number of sampling points in the period of the light emission pattern,
control the lighting device to perform pulse modulation with a pulse pattern having a second time length shorter than the first time length with respect to the second characteristic of the light emitted from the lighting device in accordance with the information to be transmitted, and
set, for each of a plurality of subsections obtained by dividing the period by the number of sampling points, a peak value and a bottom value of the second characteristic of each pulse included in a subsection, to make an average value of the second characteristic of the light emitted from the lighting device in the subsection after multiplexing of the pulse modulation and the modulation by the light emission pattern equal to a value of the second characteristic at a sampling point of the light emission pattern included in the subsection according to the modulation by the light emission pattern.

2. The transmitting device as claimed in claim 1, wherein the processor is configured to set, for each of the plurality of subsections, the peak value and the bottom value of the second characteristic of each pulse included in the subsection, to make a value of the second characteristic due to the waveform of the light emission pattern in the subsection equal to the average value of the second characteristic of the light emitted from the lighting device in the subsection.

3. The transmitting device as claimed in claim 1, wherein the processor is configured to set, for each of the plurality of subsections, the peak value and the bottom value of the second characteristic of each pulse included in the subsection, to make a difference between the peak value and the bottom value for the second characteristic of each pulse constant over an entire period.

4. The transmitting device as claimed in claim 1, wherein the first characteristic is a luminescent color of the light emitted from the lighting device, and the second characteristic is a certain color component of the light emitted from the lighting device.

5. The transmitting device as claimed in claim 1, wherein each of the first characteristic and the second characteristic is luminance of the light emitted from the lighting device.

6. A transmission control device, comprising:
a processor configured to
control a lighting device to modulate the first characteristic of light, which is emitted from the lighting device according to a light emission pattern having a waveform according to information to be transmitted and having a first time length, along time series in a period having the first time length,
set a number of sampling points in the period of the light emission pattern,
control the lighting device to perform a pulse modulation with a pulse pattern having a second time length shorter than the first time length with respect to a second characteristic of the light emitted from the lighting device according to the information to be transmitted, and set, for each of a plurality of subsections obtained by dividing the period by the number of sampling points, a peak value and a bottom value of the second characteristic of each pulse included in the subsection, to make an average value of the second characteristic of the light emitted from the lighting device in the subsection after multiplexing of the pulse modulation and the modulation by the light emission pattern equal to a value of the second characteristic at a sampling point of the light emission pattern included in the subsection according to the modulation by the light emission pattern.

7. A communication method, comprising:

modulating, in a period having a first time length, a first characteristic of light emitted from a lighting device in time series in accordance with a light emission pattern having a waveform according to information to be transmitted and having the first time length;

setting a number of sampling points in the period of the light emission pattern;

performing pulse modulation with a pulse pattern having a second time length shorter than the first time length with respect to a second characteristic of the light emitted from the lighting device in accordance with the information to be transmitted; and setting, for each of a plurality of subsections obtained by dividing the period by the number of sampling points, a peak value and a bottom value of the second characteristic of each pulse included in a subsection, to make an average value of the second characteristic of the light emitted from the lighting device in the subsection after multiplexing of the pulse modulation and the modulation by the light emission pattern equal to a value of the second characteristic at a sampling point of the light emission pattern included in the subsection according to the modulation by the light emission pattern.

* * * * *